(12) United States Patent
Mohanty et al.

(10) Patent No.: US 12,293,165 B2
(45) Date of Patent: May 6, 2025

(54) SYSTEM AND METHOD FOR MONITORING OF SOFTWARE APPLICATIONS AND HEALTH ANALYSIS

(71) Applicant: Calibo LLC, Miami, FL (US)

(72) Inventors: Shubhabrata Mohanty, Pune (IN); Pritam Sadhukhan, Pune (IN)

(73) Assignee: Calibo LLC, Miami, FL (US)

( * ) Notice: Subject to any disclaimer, the term of this patent is extended or adjusted under 35 U.S.C. 154(b) by 294 days.

(21) Appl. No.: 17/822,408

(22) Filed: Aug. 25, 2022

(65) Prior Publication Data

US 2023/0067084 A1    Mar. 2, 2023

Related U.S. Application Data

(60) Provisional application No. 63/260,723, filed on Aug. 30, 2021.

(51) Int. Cl.
  *G06F 8/10*   (2018.01)
  *G06F 8/20*   (2018.01)
  (Continued)

(52) U.S. Cl.
  CPC .................. *G06F 8/10* (2013.01); *G06F 8/20* (2013.01); *G06F 8/311* (2013.01); *G06F 8/34* (2013.01);
  (Continued)

(58) Field of Classification Search
  None
  See application file for complete search history.

(56) References Cited

U.S. PATENT DOCUMENTS 8,108,234 B2   1/2012   Suenbuel et al.
10,749,939 B2   8/2020   Moon et al.
(Continued)

FOREIGN PATENT DOCUMENTS

JP    2004265278 A    9/2004

OTHER PUBLICATIONS

A. Kumar, N. Karnik and C. K. Ravindranath, "Moving from data modeling to process modeling in CIM," 2005 9th IFIP/IEEE International Symposium on Integrated Network Management, 2005. IM 2005., Nice, France, 2005, pp. 673-686. (Year: 2005).*
(Continued)

*Primary Examiner* — Andrew M. Lyons
(74) *Attorney, Agent, or Firm* — CHIP Law Group

(57) ABSTRACT

A system for facilitating analysis of a software product is provided. The system includes processing circuitry that collects data logs from various technologies associated with at least one stage of a software development life cycle (SDLC) of the software product. The processing circuitry identifies entities associated with each collected data log, and standardizes the collected data logs such that each collected data log is standardized based on standard data formats associated with the identified entities. Each entity corresponds to at least one stage of the SDLC of the software product. Further, the processing circuitry updates data models associated with the entities based on the standardized data logs and generates a unified data model that is indicative of a correlation between the entities. Based on the correlation indicated by the unified data model, the processing circuitry executes an automated action.

20 Claims, 20 Drawing Sheets

(51) Int. Cl.
| | |
|---|---|
| *G06F 8/30* | (2018.01) |
| *G06F 8/34* | (2018.01) |
| *G06F 8/41* | (2018.01) |
| *G06F 8/51* | (2018.01) |
| *G06F 8/60* | (2018.01) |
| *G06F 8/77* | (2018.01) |
| *G06F 9/451* | (2018.01) |
| *G06F 11/36* | (2006.01) |
| *G06F 11/3604* | (2025.01) |
| *H04L 41/082* | (2022.01) |

(52) U.S. Cl.
CPC ............... *G06F 8/447* (2013.01); *G06F 8/51* (2013.01); *G06F 8/60* (2013.01); *G06F 8/77* (2013.01); *G06F 9/451* (2018.02); *G06F 11/3608* (2013.01); *H04L 41/082* (2013.01)

(56) References Cited

U.S. PATENT DOCUMENTS

| | | | |
|---|---|---|---|
| 10,810,074 B2 | 10/2020 | Yu et al. | |
| 11,314,758 B2 | 4/2022 | Marquardt et al. | |
| 11,586,423 B2 | 2/2023 | Körner | |
| 11,748,064 B2 | 9/2023 | Mohanty et al. | |
| 2005/0160104 A1 | 7/2005 | Meera et al. | |
| 2010/0011337 A1* | 1/2010 | Young | G06F 8/70 717/104 |
| 2011/0225163 A1 | 9/2011 | Lyon | |
| 2013/0086116 A1 | 4/2013 | Agarwal et al. | |
| 2014/0096104 A1 | 4/2014 | Novak et al. | |
| 2014/0130036 A1 | 5/2014 | Gurikar et al. | |
| 2018/0046455 A1 | 2/2018 | Walsh et al. | |
| 2018/0082233 A1* | 3/2018 | Apshankar | G06F 11/328 |
| 2019/0095478 A1 | 3/2019 | Tankersley et al. | |
| 2019/0227824 A1 | 7/2019 | Kuchoor et al. | |
| 2020/0026641 A1 | 1/2020 | Rajagopalan et al. | |
| 2020/0117427 A1 | 4/2020 | Mcgloin et al. | |
| 2020/0167215 A1 | 5/2020 | Sidhu | |
| 2020/0337648 A1* | 10/2020 | Saripalli | G06N 20/00 |
| 2020/0358757 A1 | 11/2020 | Kulkarni et al. | |
| 2020/0401379 A1 | 12/2020 | Appel et al. | |
| 2021/0117313 A1 | 4/2021 | Geary | |
| 2021/0216293 A1 | 7/2021 | Siram et al. | |
| 2021/0286638 A1 | 9/2021 | Fan et al. | |
| 2021/0334146 A1 | 10/2021 | Kulkarni et al. | |
| 2022/0051162 A1 | 2/2022 | Fox et al. | |
| 2022/0334950 A1 | 10/2022 | Balan et al. | |

OTHER PUBLICATIONS

S. Martínez-Fernández et al., "Continuously Assessing and Improving Software Quality With Software Analytics Tools: A Case Study," in IEEE Access, vol. 7, pp. 68219-68239, 2019. (Year: 2019).*

Notice of Allowance received in U.S. Appl. No. 17/027,163 on May 24, 2023.

"Splunk Observability Cloud Integrations" available at <<https://www.splunk.com/en_us/app-integrations.html>>.

"Splunk® Intelligence Management—Welcome to Splunk Intelligence Management" available at <<https://docs.splunk.com/Documentation/SIM/current/Intro/Glossary>>.

"BigPanda's Open Integration Hub" available at <<https://www.bigpanda.io/our-product/open-integration-hub/>>.

"Algorithmic Correlation" available at <<https://docs.bigpanda.io/docs/correlation>>.

Cingolani et al., "BigDataScript: a scripting language for data pipelines" (Year: 2015).

Notice of allowance for U.S. Appl. No. 17/823,402, dated Mar. 14, 2024.

Notice of Allowance, U.S. Appl. No. 17/899,387, received on Dec. 27, 2023.

Non-final office action, U.S. Appl. No. 17/823,321, received on Jan. 25, 2024.

* cited by examiner

| Name of job | Build reference number | Time of job | Stage identification number | Name of stage | Commit identification number | Date of scan | Vulnerability score |
|---|---|---|---|---|---|---|---|
| Name1 | 122 | 127000 | 1 | Name2 | 5470fD | 16595 | 3 |

First data log DL1

FIG. 5A

SYSTEM AND METHOD FOR MONITORING OF SOFTWARE APPLICATIONS AND HEALTH ANALYSIS

CROSS-REFERENCE TO RELATED APPLICATIONS/INCORPORATION BY REFERENCE

This Patent Application makes reference to, claims priority to, and claims the benefit of U.S. Provisional Application No. 63/260,723, filed Aug. 30, 2021, the contents of which are hereby incorporated herein by reference in its entirety.

FIELD

Various embodiments of the disclosure relate generally to software product development. More specifically, various embodiments of the disclosure relate to methods and systems for monitoring of software applications and health analysis.

BACKGROUND

In the past few decades, the technological landscape has been radically transformed due to rapid proliferation of digital technology. Many new-age organizations (e.g., start-ups) that specialize in software products (e.g., e-commerce applications, e-learning applications, or ride-sharing applications) have been established and have gained prominence in recent times. Further, a large proportion of legacy organizations (e.g., businesses, governments, non-profit organizations, or the like) have undergone digital transformation to develop software products and/or software solutions for optimizing various operations, such as sales, marketing, customer relations, or inventory management. Such software products or solutions may enable an organization to conduct desired operations with alacrity and optimal quality.

The life cycle of a software product may include various stages like a definition stage, a design stage, a development stage, a deployment stage, a post-deployment monitoring stage, and a management stage. Further, the software product may repeatedly undergo such stages since the software may be continuously evolving and/or improving, as per advancements in technologies and changes in requirements of the organization. The evolution and/or the improvement of the software product may be facilitated by the post-deployment monitoring of the software product. The post-deployment monitoring of the software product leads to generation of huge chunks of monitoring data. Such chunks of monitoring data are processed to analyze the software product. The analysis of the software product may result in the determination of various insights related to the software product (e.g., detection of various anomalies in the software product). Further, to fast-track and automate the aforementioned process, artificial intelligence and related technologies, such as machine learning and natural language processing, are utilized. Typically, exclusively monitoring data generated during the post-deployment monitoring of the software product is utilized to analyze the software product. This limits the degree of insights determined for the software product (e.g., types of anomalies detected in the software product is limited).

Limitations and disadvantages of conventional and traditional approaches will become apparent to one of skill in the art, through comparison of described systems with some aspects of the disclosure, as set forth in the remainder of the present application and with reference to the drawings.

SUMMARY

Methods for monitoring of software applications and health analysis are provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

BRIEF DESCRIPTION OF THE DRAWINGS

FIGS. 5A-5D are schematic diagrams that illustrate data model update based on a first data log, in accordance with an exemplary embodiment of the disclosure;

DETAILED DESCRIPTION

Figure 1:
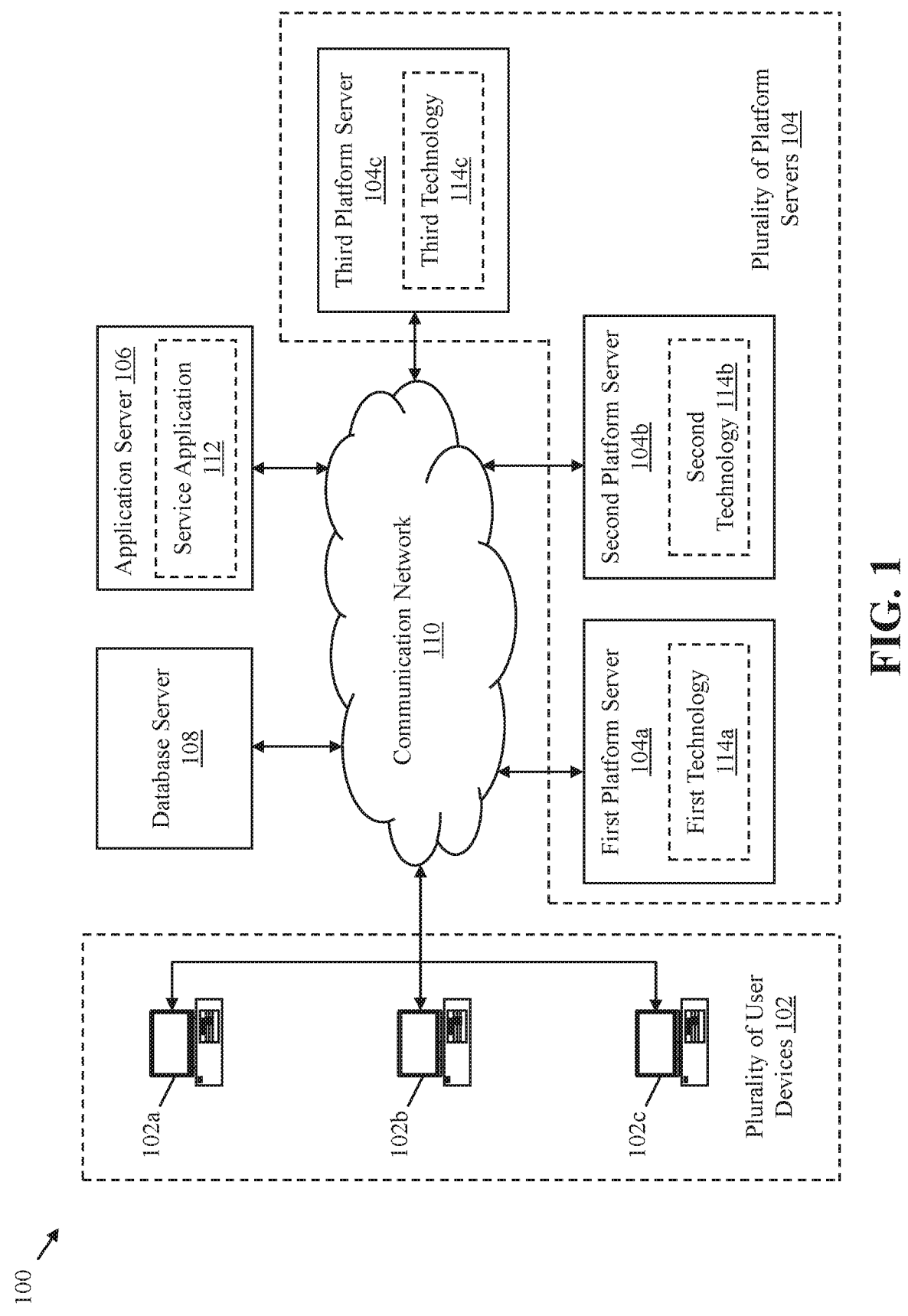
FIG. 1 is a block diagram that illustrates a system environment for facilitating analysis of a software product, in accordance with an exemplary embodiment of the disclosure.

Certain embodiments of the disclosure may be found in the disclosed systems and methods for facilitating analysis of a software product. Exemplary aspects of the disclosure provide a system including processing circuitry that may be configured to collect a plurality of data logs from a plurality of technologies. Each of the plurality of technologies is associated with at least one of a plurality of stages of a software development life cycle (SDLC) of the software product. The processing circuitry may be further configured to identify, from a plurality of entities, a set of entities associated with each of the collected plurality of data logs. Each of the plurality of entities corresponds to at least one of the plurality of stages of the SDLC of the software product. The plurality of entities is associated with a plurality of data models. Further, the processing circuitry may be configured to standardize the collected plurality of data logs and update the plurality of data models based on the standardized plurality of data logs. The plurality of data models is updated such that each of the standardized plurality of data logs is utilized to update a set of data models, of the plurality of data models, associated with the identified set of entities. The processing circuitry may be further configured to generate, based on the updated plurality of data models, a unified data model that is indicative of a correlation between the plurality of entities. Further, based on the correlation indicated by the unified data model, the processing circuitry may be configured to execute an automated action.

In some embodiments, the plurality of stages of the SDLC of the software product includes a definition stage, a design stage, a development stage, a deployment stage, a post-deployment monitoring stage, and a management stage.

In some embodiments, each of the collected plurality of data logs includes a plurality of technology-specific attributes and a plurality of attribute values for the plurality of technology-specific attributes. Each data model of the plurality of data models, associated with the corresponding entity of the plurality of entities, includes a plurality of standard attributes. Each of the plurality of technology-specific attributes and each of the plurality of standard attributes are associated with at least one of the plurality of stages of the SDLC of the software product.

In some embodiments, to standardize each of the collected plurality of data logs, the processing circuitry may be further configured to segregate, based on the set of entities, the plurality of technology-specific attributes into one or more sets of technology-specific attributes such that each of the one or more sets of technology-specific attributes is associated with one of the set of entities. Further, the processing circuitry may be configured to identify one or more sets of standard attributes corresponding to the one or more sets of technology-specific attributes, respectively. Each of the one or more sets of standard attributes is associated with an entity of the set of entities and is identified from the plurality of standard attributes associated with the corresponding entity. The processing circuitry may be further configured to convert each of the one or more sets of technology-specific attributes to the corresponding set of standard attributes.

In some embodiments, each of the collected plurality of data logs is standardized based on a set of standard data formats associated with the set of entities. Each of the one or more sets of standard attributes has a standard data format of the set of standard data formats and each of the one or more sets of technology-specific attributes is converted to the corresponding set of standard attributes based on the associated standard data format.

In some embodiments, each entity of the plurality of entities includes a plurality of sub-entities. Each of the one or more sets of standard attributes includes one or more subsets of standard attributes associated with one or more sub-entities of the corresponding plurality of sub-entities, respectively.

In some embodiments, the processing circuitry may be further configured to identify, from the plurality of attribute values, one or more sets of attribute values associated with the one or more sets of technology-specific attributes, respectively. Further, the processing circuitry may be configured to map the one or more sets of attribute values to the one or more sets of standard attributes, respectively. The mapped one or more sets of attribute values of each of the standardized plurality of data logs is utilized to update the set of data models associated with the corresponding set of entities.

In some embodiments, the unified data model includes the plurality of standard attributes of each of the plurality of data models and a set of attribute values mapped to each standard attribute of each data model.

In some embodiments, the correlation between the plurality of entities corresponds to one or more standard attributes associated with one entity of the plurality of entities being correlated with one or more standard attributes associated with at least one remaining entity of the plurality of entities.

In some embodiments, the processing circuitry may be further configured to determine, based on a set of metrics and the unified data model, an insight associated with the software product. The set of metrics may be indicative of two or more sets of standard attributes, associated with two or more entities of the plurality of entities, respectively, required to determine the insight.

In some embodiments, the insight may be indicative of at least one of a health of the software product, a security level of the software product, a performance of the software product, and/or a quality level of the software product. The automated action may be executed based on the insight. The execution of the automated action may correspond to generation of an alert.

In some embodiments, the processing circuitry may be further configured to receive a user input for generating the set of metrics from a user device of a user, and identify, from the plurality of entities, the two or more entities associated with the user input. Further, the processing circuitry may be configured to identify, for the two or more entities, from the corresponding pluralities of standard attributes, the two or more sets of standard attributes, respectively. The processing circuitry may be further configured to generate a query based on the two or more sets of standard attributes, validate the query based on the unified data model, and generate the set of metrics based on the two or more sets of standard attributes and the validation of the query.

In some embodiments, to determine the insight associated with the software product, the processing circuitry may be further configured to generate a query based on the set of metrics. The query may be indicative of the correlation between the two or more entities. Further, the processing circuitry may be configured to retrieve, from the unified data model based on the query, response data that includes two or more sets of attribute values of the two or more sets of standard attributes, respectively, and process the response data. The insight associated with the software product is determined based on the processed response data.

In some embodiments, the processing circuitry may be further configured to determine, based on the unified data model, an insight associated with the software product. The insight is indicative of at least one of a health of the software product, a security level of the software product, a performance of the software product, and/or a quality level of the software product. The automated action is executed based on the insight. The execution of the automated action corresponds to generation of an alert.

In some embodiments, the unified data model is generated further based on a relationship matrix associated with the plurality of entities. The relationship matrix corresponds to one or more rules that define the correlation between the plurality of entities.

FIG. 1 is a block diagram that illustrates a system environment 100 for facilitating analysis of a software product, in accordance with an exemplary embodiment of the disclosure. The system environment 100 is shown to include a plurality of user devices 102 and a plurality of platform servers 104. For the sake of brevity, it is assumed that the plurality of user devices 102 includes first through third user devices 102a-102c and the plurality of platform servers 104 includes first through third platform servers 104a-104c. The system environment 100 is further shown to include an application server 106, a database server 108, and a communication network 110. The plurality of user devices 102, the plurality of platform servers 104, the application server 106, and the database server 108 may communicate with each other by way of the communication network 110.

The first user device 102a may include suitable logic, circuitry, interfaces, and/or code, executable by the circuitry, that may be configured to execute one or more instructions based on user inputs received from a corresponding user. The first user device 102a may be further configured to execute a service application 112 that is hosted by the application server 106. In one embodiment, the service application 112 may be a standalone application installed on the first user device 102a. In another embodiment, the service application 112 may be accessible by way of a web browser installed on the first user device 102a. Examples of the first user device 102a may include, but are not limited to, a personal computer, a laptop, a smartphone, a tablet, or the like. The second and third user devices 102b and 102c may be functionally similar to the first user device 102a.

In one embodiment, the plurality of user devices 102 may be operated by a corresponding plurality of users associated with an organization. Examples of the organization include, but are not limited to, businesses, governments, non-profit organizations, or the like. In a non-limiting example, the organization may intend to develop and analyze a software product (e.g., a software application). The plurality of users may utilize the plurality of user devices 102 for various stages during a software development lifecycle (SDLC) of the software product and for analyzing the software product. Examples of the software product may include software applications such as, but not limited to, e-commerce applications, video streaming applications, productivity applications, e-learning applications, or the like. It will be apparent to those of skill in the art that examples of the software product are not limited to those mentioned above. In an actual implementation, the software product may include any enterprise or consumer software application.

The various stages of SDLC may include a definition stage, a design stage, a development stage, a deployment stage, a post-deployment monitoring stage, and a management stage. The definition stage, the design stage, the development stage, the deployment stage, the post-deployment monitoring stage, and the management stage may be collectively referred to as a "plurality of stages" of the SDLC of the software product.

During the definition stage, business or technology ideas, requirements, feasibility, risks, cost, or the like, associated with the yet-to-be-developed software product may be analyzed and defined. Further, during the definition stage, roles for users (e.g., the plurality of users) in the development of the software product may be defined. In other words, the definition stage may be a stage associated with an ideation and/or corresponding pre-design analysis of the software product. An ideation process may include sourcing ideas from various stakeholders (e.g., users associated with technology-oriented roles such as developers, users associated with business-oriented roles such as managers or executives in the organization, or the like) for developing new software products or adding features in existing software products. The ideation process may further include evaluation of these ideas by the stakeholders, filtering of these ideas, and/or refinement of these ideas. In one embodiment, the ideation process may further include the creation of a prototype of the software product (e.g., the software application or a proof-of-concept of the software product).

The ideation process may further include evaluation or analysis (e.g., by the stakeholders) of requirements, risks, and/or costs associated with the development of the software product. Such analysis and ideation ensure mitigation or avoidance of various issues that may be faced during subsequent stages. In one embodiment, the definition stage may also include the creation of a plan (e.g., a project plan) for the design, development, deployment, and post-deployment monitoring of the software product. In an example, project management tools (e.g., Jira®, Trello®, or the like) may be utilized for creating the project plan. Further, such ideation for the software product may require interaction and collaboration among the stakeholders. For example, various stakeholders may collaborate and perform various actions (e.g., conduct discussions, conduct presentations, perform research, perform analysis, or the like) to facilitate the ideation process. In an example, the stakeholders may collaborate by way of one or more collaboration tools (e.g., Microsoft Teams®, Zoom®, Google Meet®, Slack®, or the like). The stakeholders may have discussions or exchange ideas, information, data, files, or the like, by way of such collaboration tools. Beneficially, such collaboration among the stakeholders facilitates seamless and efficient ideation for the software product.

During the definition stage, a documentation process for the software product may additionally be initiated. The documentation process may include the generation of documents to document various inputs and outputs of the ideation process. The generated documents may include, but are not limited to, the ideas sourced from the stakeholders, results of the evaluation of the ideas, a set of finalized ideas, the proof-of-concept of the software product, a result of the evaluation of the risks, details of the prototype or the proof-of-concept of the software product, and the cost associated with the development of the software product. The generated documents may further include a workflow associated with the working of the software product, a design of the software product, a project plan for the development of the software product, and/or a set of access permissions associated with the software product. In an embodiment, the plurality of users may select one or more technologies (e.g., Confluence®, Google Docs®, Sharepoint®, or the like) for documentation of various inputs and outputs associated with the definition stage to store various files, links, attributes, tags, or the like, associated with the software product. The definition stage may be followed by the design stage.

During the design stage, the architecture and technical design of the software product may be created or prepared. Based on the ideas, requirements, or the like, that are defined at the definition stage, one or more tools, technologies, and/or design philosophies may be adopted (e.g., by the plurality of users) for developing the software product. In one embodiment, the design stage may include creation of user interface (UI) designs (e.g., UI design mock-ups), user experience (UX) designs, technical designs, data organization designs, or the like, associated with the software product. The UI design may provide an estimate of a layout and architecture of one or more UIs of the software product. The UX design for the software product may yield an estimation of an experience that may be encountered by users while interacting with the one or more UIs of the software product. The technical designs may refer to an estimation of programming languages and technologies and corresponding configurations to be used for the SDLC of the software product. The data organization designs may include schemas and subschemas, metadata management plan, or the like, associated with data used or generated during the lifecycle of the software product. The design stage of the software product may also involve creating or preparing designs for different versions of the software product. Further, the design stage allows for a mapping of the ideas and requirements associated with the definition stage with various designs generated during the design stage. The design stage is followed by the development stage.

During the development stage, the technology stack for developing the software product may be selected. Further, during the development stage, the software product (e.g., the software application) may be built (e.g., created or developed) using the selected technology stack. The definition and design stages may be implemented in a detailed and organized manner which allows for a hassle-free development of the software product. For example, the set of programming languages may be made available to the plurality of users (e.g., developers) for the development of the software product. Further, one or more technologies for version control or source code management (e.g., GitHub®, Gitlab®, or the like) may be used for storage of code, libraries, files, or the like, associated with the software product. Further, the development stage also enables users (e.g., the plurality of users) to commit, execute, and test the code for the software product. In an embodiment, the development stage may further include a testing sub-stage. During the testing sub-stage, code committed to a repository may be tested using various unit testing tools. Examples of the unit testing tools include, but are not limited to, NUnit®, JUnit®, TestNG®, or the like. The detected bugs, anomalies, and/or errors may be reported (e.g., to a user who committed the Java code snippet and/or the plurality of users). In one embodiment, the detected bugs, anomalies, errors, or the like, may be debugged or removed automatically by way of various technologies or a manual input provided via the plurality of user devices 102. The development stage may be followed by the deployment stage.

The deployment stage refers to deployment or release of the software product in various deployment environments (e.g., a development environment, a quality analysis environment, a pre-production environment, a production environment, or the like). The deployment stage may include management of operations to deploy the software product. The deployment of the software product could be manual, scheduled, or automated. In one embodiment, the deployment stage may facilitate implementation of a continuous integration/continuous deployment (CI/CD) pipeline that enables automated deployment and/or delivery of the software product. In an embodiment, one or more CI/CD technologies or CI/CD automation tools (e.g., Jenkins®, CircleCI®, or the like) may be used for the implementation of the CI/CD pipelines. Various other tools, services, and/or technologies may be used for implementing various stages in the CI/CD pipeline, in conjunction with the one or more CI/CD automation tools. Examples of the various stages in the CI/CD pipeline may include, but are not limited to, version control, static application security testing (SAST), building, unit testing, integration testing, virtual machine provisioning, dynamic application security testing (DAST), application provisioning, or the like. Examples of tools and technologies for version control include, but are not limited to, Gitlab®, GitHub®, or the like. Examples of tools and technologies for SAST include, but are not limited to, SonarQube®, Veracode static analysis®, Codacy®, or the like.

The software product may be deployed in a cloud-agnostic manner and a technology-agnostic manner. The technology agnostic nature of the software product allows the software product to be generalized so that it could be deployed across a plurality of platforms simultaneously. The cloud agnostic nature of the software product ensures that the software product may be deployed in any cloud environment for use of cloud-based platforms. Being cloud agnostic, the software product may be deployed on any cloud-based platform, may use corresponding cloud services, and may take advantage of different features and price structures offered by different cloud-based platforms. The product may be tested before it is deployed in a production environment. The deployment stage is followed by the post-deployment monitoring stage.

The post-deployment monitoring stage may refer to continuous and/or periodic monitoring of an operation of the software product. Various tools or technologies (e.g., Dynatrace®, Datadog®, or the like) may be utilized for monitoring the operation of the software product. In one embodiment, the monitoring of the operation of the software product may include monitoring of a security posture of the software product, monitoring of deployment infrastructure for the software product, generation of application insights, or the like. The security posture of the software product may be a measure of a level of security of the software product against cyberthreats. Monitoring of the security posture of the software product may include, but is not limited to, conducting cybersecurity assessment of the software product, identification of risks to the software product, tracking security metrics, or the like. Infrastructure monitoring may refer to the monitoring of infrastructure (e.g., virtual machines, containers, data stores, processors, servers, or the like) associated with the deployed software product. Infrastructure monitoring for the software product may include, but is not limited to, measurement of metrics (e.g., uptime, downtime, or the like) pertaining to the infrastructure deployed for the software product, analysis of problems in the infrastructure, or the like. Application insights for the software product may refer to measurement of various metrics (e.g., a number of received requests, response times for requests, failure rate, performance, or the like) associated with the software product. In other words, the application insights may refer to information or data generated based on analysis of requirement, usage, and/or performance of the software product.

The management stage may refer to the overall management of software products. The organization may develop multiple software products. In such cases, the management stage facilitates segregation of operations, data, or the like, for each software product. Additionally, the management stage may correspond to the management of various processes implemented for developing the software products. Various tools or technologies (e.g., a platform on which the software products are being developed) may be utilized for managing the software product. In one embodiment, the management of the operation of the software product may include determining maturity of the software product.

It will be apparent to those of skill in the art that the scope of the disclosure is not limited to the SDLC of the software product including only the above-mentioned stages. In various other embodiments, the SDLC of the software product may include additional or different stages, without deviating from the scope of the disclosure.

The first platform server 104a may include suitable logic, circuitry, interfaces, and/or code, executable by the circuitry, that may be configured to host a first technology 114a. In one embodiment, the first technology 114a may be one of the various technologies, tools, services, or the like, available for defining, designing, developing, deploying, monitoring, or managing the software product as described above. In other words, the first technology 114a may be a software application or a software solution that is available for the definition, design, development, deployment, security, operation, monitoring, or management of the software product. The first technology 114a may correspond to one of a software-as-a-service (SaaS), a platform-as-a-service (PaaS), or an infrastructure-as-a-service (IaaS). The first technology 114a may include any application that may be required by the organization at any stage during the SDLC of the software product.

The first technology 114a may thus include any application required for facilitating the definition, design, development, deployment, post-deployment monitoring, or management of the software product. For example, the first technology 114a may include a technology (e.g., a software application, a software solution, or a software tool) for requirement analysis, a technology for planning or project management, or a technology for software architectural design. The first technology 114a may further include a technology for software development, a technology for software testing, a technology for software deployment, a technology for software maintenance, or a technology for document management. Further, the first technology 114a may include a technology for project management, a technology for repository management (e.g., code commits), a technology for SAST, a technology for DAST, a technology for CI/CD pipeline management, a technology for infrastructure provisioning, or a technology for cloud deployment.

Technologies available for various stages of the SDLC of the software product may be well known to those of skill in the art. Examples of the first technology 114a may include, but are not limited to, Microsoft Teams®, Zoom®, Google Meet®, Slack®, Confluence®, Google Docs®, Sharepoint®, GitHub®, Gitlab®, NUnit®, JUnit®, TestNG®, Jenkins®, CircleCI®, SonarQube®, Veracode static analysis®, Codacy®, Jira®, Trello®, Dynatrace®, Datadog®, or the like. For the sake of brevity, the terms "software product", "product", and "software application" are used interchangeably throughout the entire disclosure.

The first technology 114a may also correspond to a platform that enables end-to-end definition, design, development, deployment, monitoring, and management of the software product. The platform may be utilized by various stakeholders (e.g., business partners, developers, product designers, or the like) to collaborate at various stages of development of the software product. Further, the platform may enable the organization to select various technologies for the definition, design, development, deployment, monitoring, and management of the software product, based on requirements/choices of the organization. In other words, the first technology 114a enables selection/creation of a technology stack required for the SDLC of the software product. A technology stack may refer to a set of programming languages, frameworks, and tools or technologies (e.g., tools or technologies for development, continuous integration-continuous deployment, data analytics, or the like) that are required for the SDLC of the software product.

The first platform server 104a may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the first platform server 104a may be compatible with multiple operating systems.

The second and third platform servers 104b and 104c may be functionally similar to the first platform server 104a. The second and third platform servers 104b and 104c may host second and third technologies 114b and 114c, respectively. The second and third technologies 114b and 114c may each correspond to any technology associated with the SDLC of the software product.

The first through third technologies 114a-114c may generate various data during operations thereof. In one embodiment, the operation of the software product may be monitored based on the data generated by the first through third technologies 114a-114c. The data may be utilized to determine errors, events, or warnings that correspond to the operation of the software product. As the first through third technologies 114a-114c are associated with one or more stages of the SDLC of the software product, the generated data may also be associated with the one or more stages of the SDLC of the software product. Thus, the data generated by the first through third technologies 114a-114c may be utilized to determine an insight associated with the software product. The insight associated with the software product may correspond to a health of the software product, a security level of the software product, a performance of the software product, a quality level of the software product, a weakness of the software product, a threat of the software product, or the like. In an example, the insight may indicate the number and type of anomalies in the software product. The data generated by the first through third technologies 114a-114c may thus be utilized for the analysis (e.g., health analysis) of the software product.

It will be apparent to a person skilled in the art that FIG. 1 is shown to include only three platform servers (e.g., the first through third platform servers 104a-104c) that host three technologies (e.g., the first through third technologies 114a-114c) to make the illustrations concise and clear and should not be considered as a limitation of the disclosure. In actual implementation, any number (e.g., tens, hundreds, or thousands) of platform servers that host any/every technology required to implement each stage included in the SDLC of the software product may be utilized. Hereinafter, for the sake of brevity, the first through third technologies 114a-114c are designated and referred to as "the plurality of technologies 114".

Although it is illustrated that one platform server hosts one technology, the scope of the disclosure is not limited to it. In various other embodiments, multiple technologies may be hosted on a single platform server (e.g., the first platform server 104a), without deviating from the scope of the disclosure.

The application server 106 may include suitable logic, circuitry, interfaces, and/or code, executable by the circuitry, that may be configured to host the service application 112. The service application 112 hosted by the application server 106 may be an open pro-code PaaS that enables the health analysis of the software product. In an embodiment, the application server 106 may be coupled to the plurality of platform servers 104 associated with the plurality of technologies 114, and configured to collect the entire data or a portion of the data generated by the plurality of technologies 114. The application server 106 may be further configured to enable, for the plurality of user devices 102 associated with the plurality of users, access to features provided by the service application 112. For example, the plurality of users may utilize the service application 112 to design a plurality of entities (shown later in FIG. 2) for segregating the collected data. Each of the plurality of entities corresponds to at least one of the plurality of stages of the SDLC of the software product. Further, the plurality of entities is associated with a plurality of data models (shown later in FIG. 4). The application server 106 may be further configured to update the plurality of data models based on the data collected from the plurality of technologies 114. In other words, the application server 106 may be further configured to utilize the collected data to populate the plurality of data models. Based on the updated plurality of data models and a relationship matrix (shown later in FIG. 4) associated with the plurality of entities, the application server 106 may be further configured to generate a unified data model (shown later in FIG. 4) that is indicative of the correlation between the plurality of entities. The relationship matrix corresponds to one or more rules that define the correlation between the plurality of entities. Further, the unified data model may be utilized for analyzing the software product.

The application server 106 may be further configured to determine the insight associated with the software product. In an embodiment, the application server 106 may determine the insight based on the unified data model and a metric indicative of various aspects of the SDLC. The metric may be pre-defined or generated based on a user input (shown later in FIG. 4) received from a user (e.g., the plurality of users). In such a scenario, the application server 106 may be configured to enable, for the plurality of user devices 102 associated with the plurality of users, access to features provided by the service application 112 (e.g., for defining various metrics). In another embodiment, the application server 106 may determine the insight based on the unified data model. In such a scenario, artificial intelligence (AI) and related technologies, such as machine learning and natural language processing (NLP), may be utilized to determine the insights from the unified data model. Further, based on the determined insight, the application server 106 may be configured to execute an automated action. The execution of the automated action may correspond to generation of an alert (shown later in FIG. 4) and presentation of the alert on a user device (e.g., one of the plurality of user devices 102). The functionalities of the application server 106 are explained in detail in conjunction with FIGS. 4, 5A-5D, and 6.

Examples of the application server 106 may include a cloud-based server, a local server, a group of centralized servers, a group of distributed servers, or the like. The application server 106 may be implemented by one or more processors, such as, but not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the application server 106 may be compatible with multiple operating systems.

The database server 108 may include suitable logic, circuitry, interfaces, and/or code, executable by the circuitry, that may be configured to store data and perform one or more database operations associated with the stored data. Examples of the database operations may include, but are not limited to, receiving, storing, processing, and transmitting data pertaining to the use of the service application 112 by the plurality of users. The database server 108 may further receive, store, process, and transmit data associated with the plurality of users. In an embodiment, the database server 108 may be further configured to receive, store, process, and transmit data associated with usage of the plurality of user devices 102 by the plurality of users. The database server 108 may include a database such as, but not limited to, Hadoop®, MongoDB®, MySQL®, NoSQL®, Oracle®, or the like.

Examples of the database server 108 may include, but are not limited to, a personal computer, a laptop, a minicomputer, a mainframe computer, a cloud-based server, a network of computer systems, or a non-transient and tangible machine executing a machine-readable code. For the sake of brevity, the application server 106 and the database server 108 have been shown as separate systems. However, in some embodiments, the database server 108 may be integrated within the application server 106. In such scenarios, functions performed by the database server 108 may be performed by the application server 106 without deviating from the scope of the disclosure.

The communication network 110 may include suitable logic, circuitry, interfaces, and/or code, executable by the circuitry, that is configured to facilitate communication among various entities (such as the plurality of user devices 102, the plurality of platform servers 104, the application server 106, and the database server 108) described in FIG. 1. Examples of the communication network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various components (such as the plurality of user devices 102, the plurality of platform servers 104, the application server 106, and the database server 108) in the system environment 100 may be communicatively coupled to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

It will be apparent to a person skilled in the art that the system environment 100 described in conjunction with FIG. 1 is exemplary and does not limit the scope of the disclosure. In other embodiments, the system environment 100 may include different or additional components configured to perform similar or additional operations.

Figure 2:
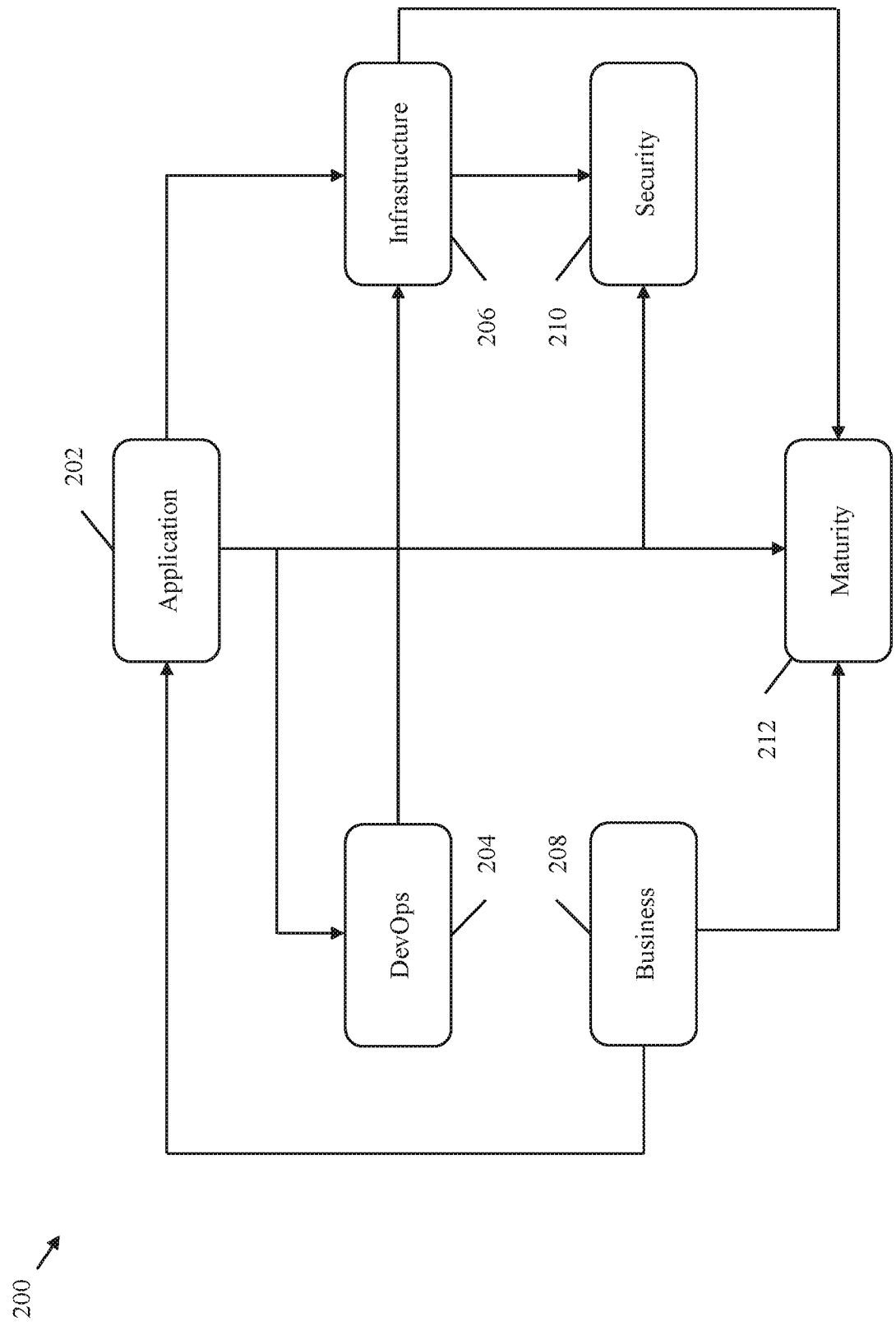
FIG. 2 is a schematic diagram that illustrates a plurality of entities and a correlation therebetween, in accordance with an exemplary embodiment of the disclosure.

FIG. 2 is a schematic diagram that illustrates the plurality of entities and a correlation therebetween, in accordance with an exemplary embodiment of the disclosure. The plurality of entities is hereinafter referred to and designated as the "plurality of entities 200". Each entity of the plurality of entities 200 corresponds to at least one of the definition, the design, the development, the deployment, the post-deployment monitoring, and the management of the software product. The plurality of entities 200 may be defined by at least one of the plurality of users by way of the service application 112 installed on an associated user device of the plurality of user devices 102.

In a non-limiting example, it is assumed that the plurality of entities 200 includes first through sixth entities, namely, an 'Application' entity 202, a 'DevOps' entity 204, an 'Infrastructure' entity 206, a 'Business' entity 208, a 'Security' entity 210, and a 'Maturity' entity 212, respectively. In such a scenario, the 'Application' entity 202 may correspond to the definition and design stages of the software product. Similarly, the 'DevOps' entity 204 may correspond to the development and deployment stages of the software product, whereas the 'Infrastructure' entity 206 may correspond to the deployment and post-deployment monitoring stages of the software product. Further, the 'Business' entity 208 may correspond to the management stage of the software product, and the 'Security' entity 210 may correspond to the development, deployment, and post-deployment monitoring stages of the software product. Lastly, the 'Maturity' entity 212 may correspond to the management stage of the software product. For example, the 'Application' entity 202 may be associated with project management data, whereas the 'DevOps' entity 204 may be associated with application code storage and code building data. Further, the 'Infrastructure' entity 206 may be associated with application monitoring data, whereas the 'Business' entity 208 may be associated with platform management data. Additionally, the 'Security' entity 210 may be associated with application security on code and infrastructure data, whereas the 'Maturity' entity 212 may be associated with process maturity data.

It will be apparent to a person skilled in the art that the scope of the disclosure is not limited to the above-mentioned six entities being designed for segregating the collected data. In various other embodiments, additional and/or different entities, each corresponding to at least one of the plurality of stages of the SDLC of the software product, may be utilized, without deviating from the scope of the disclosure.

As illustrated in FIG. 2, the plurality of entities 200 may be correlated. The correlation between the plurality of entities 200 is defined by the relationship matrix. For example, the 'Application' entity 202 may be correlated with the 'DevOps' entity 204, the 'Business' entity 208, the 'Maturity' entity 212, the 'Security' entity 210, and the 'Infrastructure' entity 206. For example, the 'Application' entity 202 is correlated with the 'DevOps' entity 204 as the software product is developed in form of code, whereas the 'Application' entity 202 is correlated with the 'Infrastructure' entity 206 as the developed software product is realized on the deployed infrastructure. Further, the 'Application' entity 202 is correlated with the 'Maturity' entity 212 by means of process improvement strategies, whereas the 'Application' entity 202 is correlated with the 'Business' entity 208 by means of the overall management of the software product. Similarly, the 'DevOps' entity 204 may be correlated with the 'Application' entity 202 and the 'Infrastructure' entity 206, whereas the 'Infrastructure' entity 206 may be correlated with the 'Application' entity 202, the 'DevOps' entity 204, the 'Security' entity 210, and the 'Maturity' entity 212. Further, the 'Business' entity 208 may be correlated with the 'Application' entity 202 and the 'Maturity' entity 212, whereas the 'Security' entity 210 may be correlated with the 'Application' entity 202 and the 'Infrastructure' entity 206. Lastly, the 'Maturity' entity 212 may be correlated with the 'Business' entity 208, the 'Application' entity 202, and the 'Infrastructure' entity 206.

The correlation between the plurality of entities 200 facilitates determination of refined insights associated with the software product. For example, the 'Application' entity 202 may indicate users working on code development, the 'DevOps' entity 204 may indicate development of the software product, and the 'Security' entity 210 may indicate code vulnerabilities. Thus, the correlation between the 'Application' entity 202, the 'DevOps' entity 204, and the 'Security' entity 210 may indicate the users that are building codes and their associated security threats.

It will be apparent to a person skilled in the art that the scope of the disclosure is not limited to the correlation between the plurality of entities 200 in the above-mentioned manner. In various other embodiments, the plurality of entities 200 may be correlated in multiple different ways, without deviating from the scope of the disclosure.

Each of the plurality of entities 200 may include various sub-entities associated therewith. Further, each sub-entity may include various standard attributes. Additionally, as mentioned above, the plurality of entities 200 is associated with the plurality of data models. Thus, each data model of the plurality of data models, associated with the corresponding entity of the plurality of entities 200, includes various standard attributes. The standard attributes of each entity may be in a standard data format, that may be different from the format of the collected data. An attribute value of each standard attribute may be empty at an initial stage. The application server 106 may populate attribute values for the standard attributes based on the data collected from the plurality of technologies 114. Sub-entities and the associated standard attributes of various entities are illustrated in FIGS. 3A-3F.

FIGS. 3A-3F, collectively, are schematic diagrams that illustrate various standard attributes of the plurality of entities 200, in accordance with an exemplary embodiment of the disclosure. Thus, various standard attributes of the 'Application' entity 202, the 'DevOps' entity 204, the 'Infrastructure' entity 206, the 'Business' entity 208, the 'Security' entity 210, and the 'Maturity' entity 212 are illustrated in FIGS. 3A-3F, respectively.

Figure 3A:
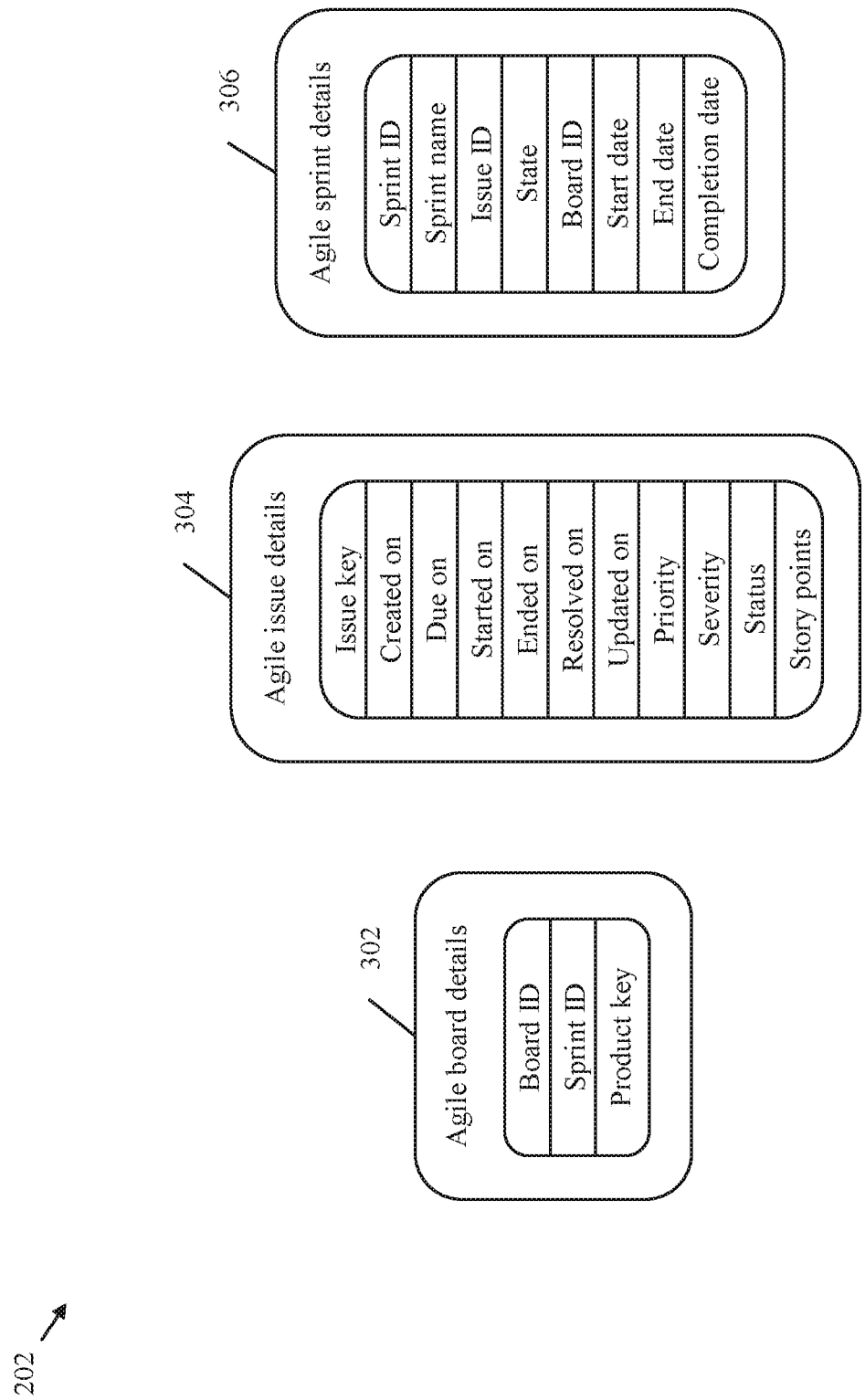
FIGS. 3A-3F, collectively, are schematic diagrams that illustrate various standard attributes of the plurality of entities, in accordance with an exemplary embodiment of the disclosure.

Referring to FIG. 3A, in a non-limiting example, it is assumed that the 'Application' entity 202 may include an 'Agile board details' sub-entity 302, an 'Agile issue details' sub-entity 304, and an 'Agile sprint details' sub-entity 306. The 'Agile board details' sub-entity 302, the 'Agile issue details' sub-entity 304, and the 'Agile sprint details' sub-entity 306 may be collectively referred to as a "first plurality of sub-entities 302-306". Each of the afore-mentioned sub-entities may correspond to at least one of the plurality of stages of the SDLC of the software product. For example, the 'Agile board details' sub-entity 302, the 'Agile issue details' sub-entity 304, and the 'Agile sprint details' sub-entity 306 may correspond to the definition stage of the software product. Although not shown, the 'Application' entity 202 may further include one or more sub-entities that may correspond to the design stage of the software product.

The 'Agile board details' sub-entity 302 may include a first set of standard attributes, namely, 'Board ID', 'Sprint ID', and 'Product Key', where ID corresponds to an identifier. Thus, attribute values of the first set of standard attributes (e.g., of the 'Agile board details' sub-entity 302) may correspond to data associated with agile boards, where an agile board is a collection of sprints. Similarly, the 'Agile issue details' sub-entity 304 may include a second set of standard attributes, namely, 'Issue key', 'Created on', 'Due on', 'Started on', 'Ended on', 'Resolved on', 'Updated on', 'Priority', 'Severity', 'Status', and 'Story points'. Thus, attribute values of the second set of standard attributes (e.g., of the 'Agile issue details' sub-entity 304) may correspond to data associated with agile descriptive issues. Further, the 'Agile sprint details' sub-entity 306 may include a third set of standard attributes, namely, 'Sprint ID', 'Sprint name', 'Issue ID', 'State', 'Board ID', 'Start date', 'End date', and 'Completion date'. Thus, attribute values of the third set of standard attributes (e.g., of the 'Agile sprint details' sub-entity 306) may correspond to data associated with sprints, where a sprint is a collection of issues. The first through third sets of standard attributes may be collectively referred to as a "first plurality of standard attributes". Each standard attribute of the first plurality of standard attributes may be associated with at least one of the plurality of stages of the SDLC of the software product. For example, each of the first plurality of standard attributes may be associated with the definition stage of the software product.

Figure 3B:
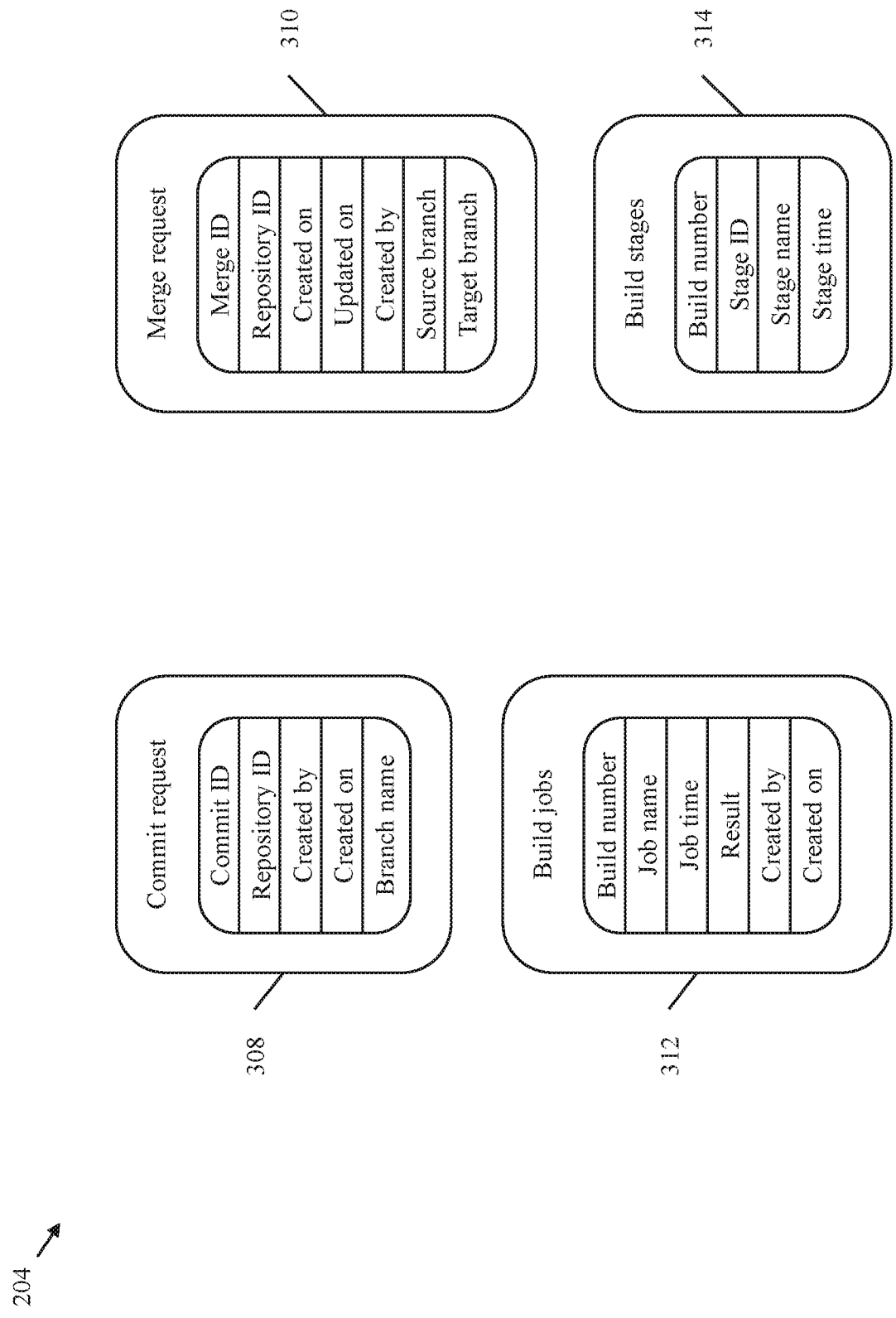

Referring now to FIG. 3B, in a non-limiting example, it is assumed that the 'DevOps' entity 204 may include a 'Commit request' sub-entity 308, a 'Merge request' sub-entity 310, a 'Build jobs' sub-entity 312, and a 'Build stages' sub-entity 314. The 'Commit request' sub-entity 308, the 'Merge request' sub-entity 310, the 'Build jobs' sub-entity 312, and the 'Build stages' sub-entity 314 may be collectively referred to as a "second plurality of sub-entities 308-314". Each of the afore-mentioned sub-entities may correspond to at least one of the plurality of stages of the SDLC of the software product. For example, the 'Commit request' sub-entity 308 and the 'Merge request' sub-entity 310 may correspond to the development stage of the software product, whereas the 'Build jobs' sub-entity 312 and the 'Build stages' sub-entity 314 may correspond to the deployment stage of the software product.

The 'Commit request' sub-entity 308 may include a fourth set of standard attributes, namely, 'Commit ID', 'Repository ID', 'Created by', 'Created on', and 'Branch name', whereas the 'Merge request' sub-entity 310 may include a fifth set of standard attributes, namely, 'Merge ID', 'Repository ID', 'Created on', 'Updated on', 'Created by', 'Source branch', and 'Target branch'. Thus, attribute values of the fourth set of standard attributes (e.g., of the 'Commit request' sub-entity 308) may correspond to data associated with code commits, whereas attribute values of the fifth set of standard attributes (e.g., of the 'Merge request' sub-entity 310) may correspond to data associated with merge requests. Similarly, the 'Build jobs' sub-entity 312 may include a sixth set of standard attributes, namely, 'Build number', 'Job name', 'Job time', 'Result', 'Created by', and 'Created on', whereas the 'Build stages' sub-entity 314 may include a seventh set of standard attributes, namely, 'Build number', 'Stage ID', 'Stage name', and 'Stage time'. Thus, attribute values of the sixth set of standard attributes (e.g., of the 'Build jobs' sub-entity 312) may correspond to data associated with code build jobs, whereas attribute values of the seventh set of standard attributes (e.g., of the 'Build stages' sub-entity 314) may correspond to data associated with build stages. The fourth through seventh sets of standard attributes may be collectively referred to as a "second plurality of standard attributes". Each of the afore-mentioned standard attributes may be associated with at least one of the plurality of stages of the SDLC of the software product. For example, each of the fourth and fifth sets of standard attributes may be associated with the development stage of the software product, whereas each of the sixth and seventh sets of standard attributes may be associated with the deployment stage of the software product.

Figure 3C:
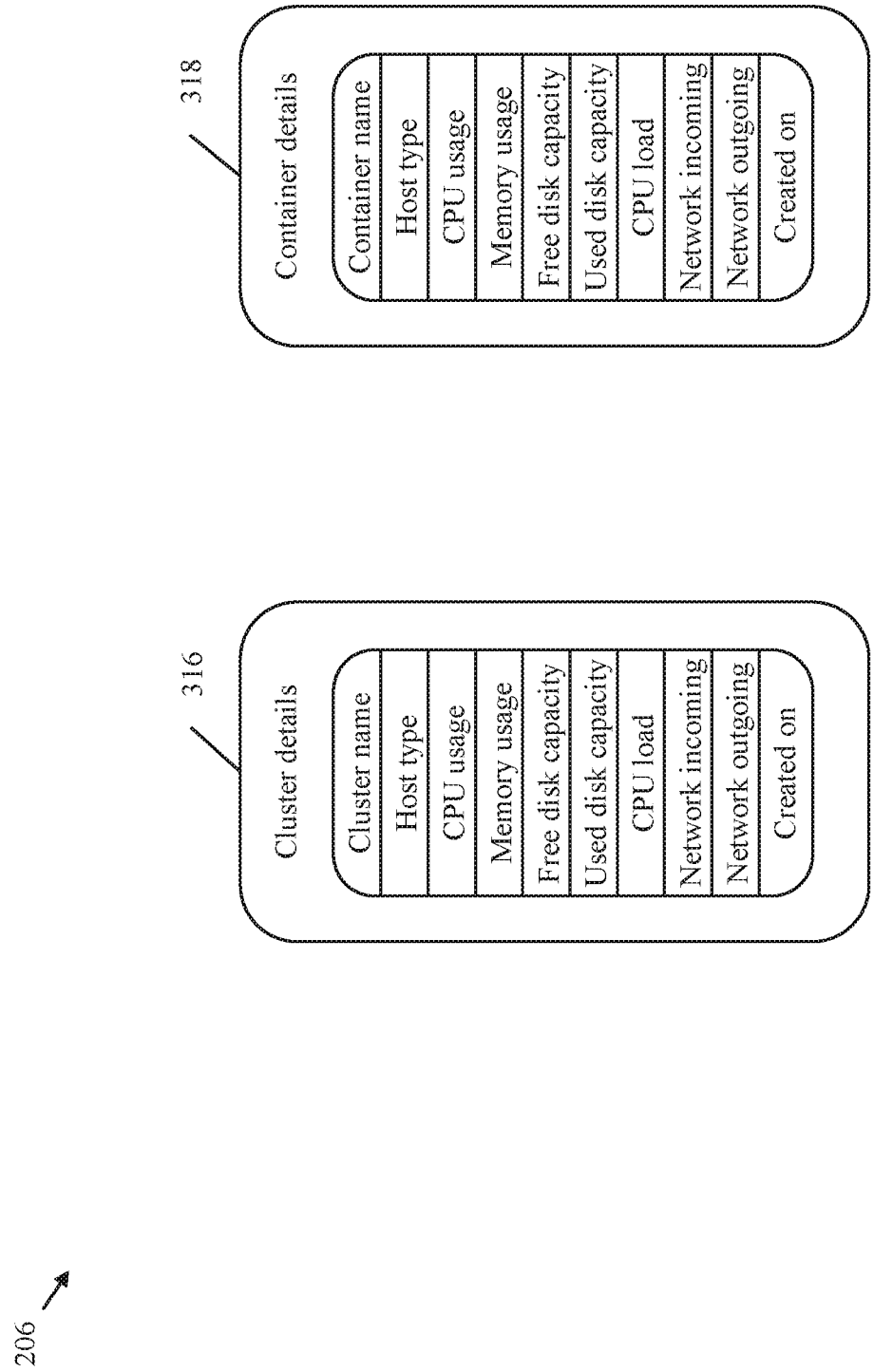

Referring now to FIG. 3C, in a non-limiting example, it is assumed that the 'Infrastructure' entity 206 may include a 'Cluster details' sub-entity 316 and a 'Container details' sub-entity 318. The 'Cluster details' sub-entity 316 and the 'Container details' sub-entity 318 may be collectively referred to as a "third plurality of sub-entities 316 and 318". Each of the afore-mentioned sub-entities may correspond to at least one of the plurality of stages of the SDLC of the software product. For example, each of the 'Cluster details' sub-entity 316 and the 'Container details' sub-entity 318 corresponds to the deployment and post-deployment monitoring stages of the software product.

The 'Cluster details' sub-entity 316 may include an eighth set of standard attributes, namely, 'Cluster name', 'Host type', 'CPU usage', 'Memory usage', 'Free disk capacity', 'Used disk capacity', 'CPU load', 'Network incoming', 'Network outgoing', and 'Created on', where CPU corresponds to a central processing unit. Thus, attribute values of the eighth set of standard attributes (e.g., of the 'Cluster details' sub-entity 316) may correspond to data associated with clusters. Similarly, the 'Container details' sub-entity 318 may include a ninth set of standard attributes, namely, 'Container name', 'Host type', 'CPU usage', 'Memory usage', 'Free disk capacity', 'Used disk capacity', 'CPU load', 'Network incoming', 'Network outgoing', and 'Created on'. Thus, attribute values of the ninth set of standard attributes (e.g., of the 'Container details' sub-entity 318) may correspond to data associated with docket containers. The eighth and ninth sets of standard attributes may be collectively referred to as a "third plurality of standard attributes". Each of the afore-mentioned standard attributes may be associated with at least one of the plurality of stages of the SDLC of the software product. For example, each of the third plurality of standard attributes may be associated with the deployment and post-deployment monitoring stages of the software product.

Figure 3D:
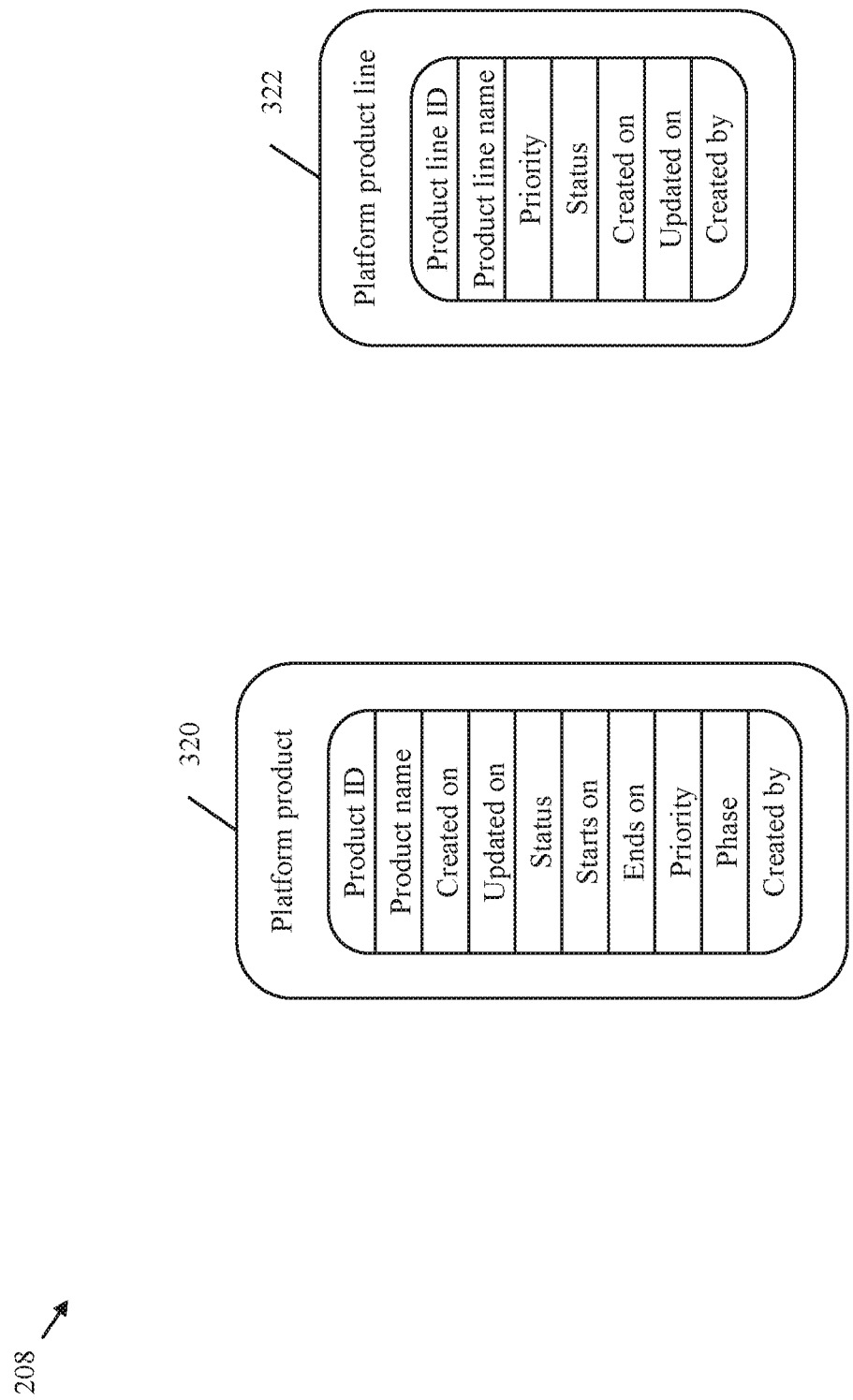

Referring now to FIG. 3D, in a non-limiting example, it is assumed that the 'Business' entity 208 may include a 'Platform product' sub-entity 320 and a 'Platform product line' sub-entity 322. The 'Platform product' sub-entity 320 and the 'Platform product line' sub-entity 322 may be collectively referred to as a "fourth plurality of sub-entities 320 and 322". Each of the afore-mentioned sub-entities may correspond to at least one of the plurality of stages of the SDLC of the software product. For example, both the 'Platform product' sub-entity 320 and the 'Platform product line' sub-entity 322 may correspond to the management stage of the software product.

The 'Platform product' sub-entity 320 may include a tenth set of standard attributes, namely, 'Product ID', 'Product Name', 'Created on', 'Updated on', 'Status', 'Starts on', 'Ends on', 'Priority', 'Phase', and 'Created by'. Thus, attribute values of the tenth set of standard attributes (e.g., of the 'Platform product' sub-entity 320) may correspond to data associated with a product, which is a group of multiple features. Similarly, the 'Platform product line' sub-entity 322 may include an eleventh set of standard attributes, namely, 'Product line ID', 'Product line name', 'Priority', 'Status', 'Created on', 'Updated on', and 'Created by'. Thus, attribute values of the eleventh set of standard attributes (e.g., of the 'Platform product line' sub-entity 322) may correspond to data associated with a group of products. The tenth and eleventh sets of standard attributes may be collectively referred to as a "fourth plurality of standard attributes". Each of the afore-mentioned standard attributes may be associated with at least one of the plurality of stages of the SDLC of the software product. For example, each of the fourth plurality of standard attributes may be associated with the management stage of the software product.

Figure 3E:
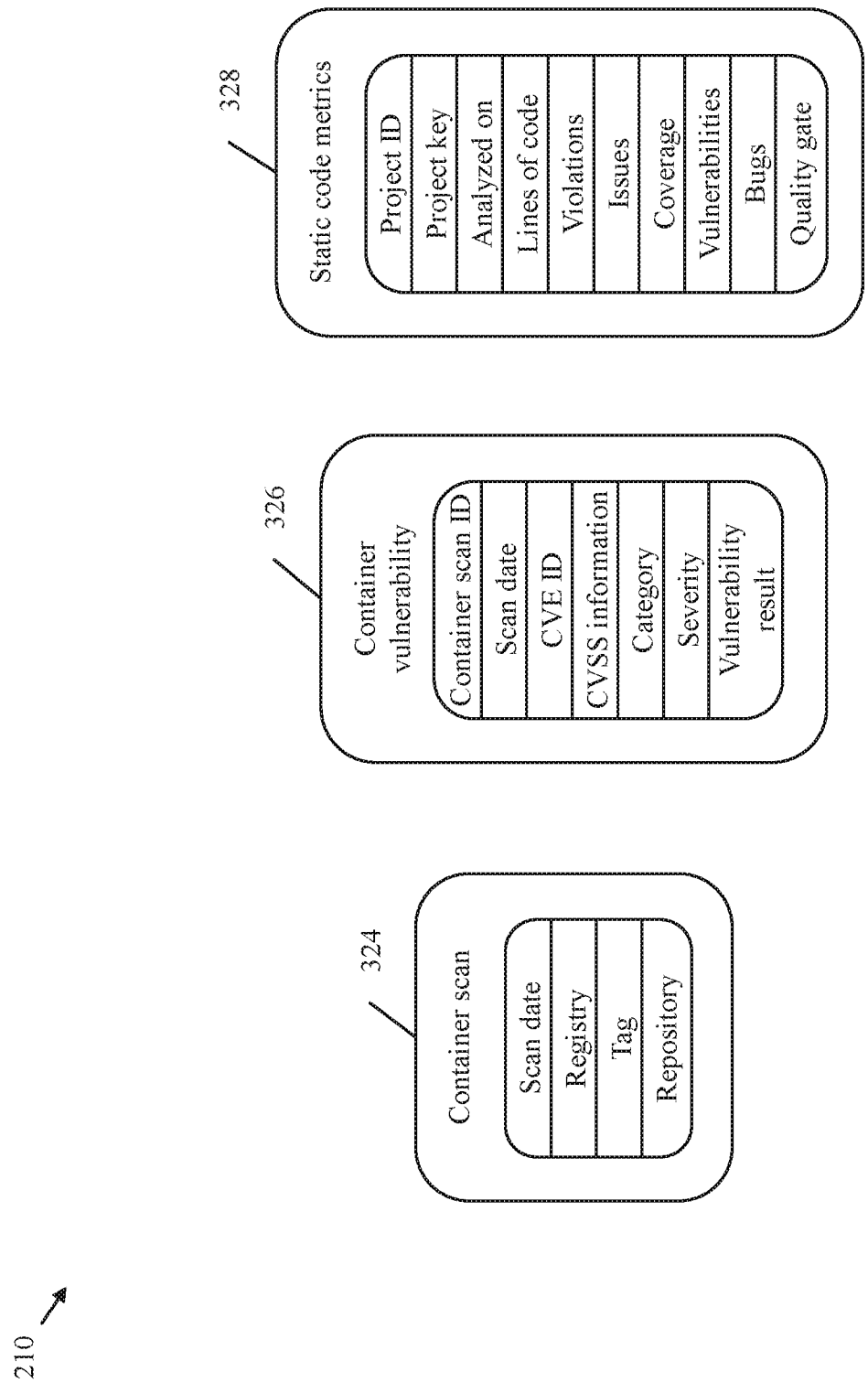

Referring now to FIG. 3E, in a non-limiting example, it is assumed that the 'Security' entity 210 may include a 'Container scan' sub-entity 324, a 'Container vulnerability' sub-entity 326, and a 'Static code metrics' sub-entity 328. The 'Container scan' sub-entity 324, the 'Container vulnerability' sub-entity 326, and the 'Static code metrics' sub-entity 328 may be collectively referred to as a "fifth plurality of sub-entities 324-328". Each of the afore-mentioned sub-entities may correspond to at least one of the plurality of stages of the SDLC of the software product. For example, the 'Container scan' sub-entity 324 and the 'Container vulnerability' sub-entity 326 may correspond to the deployment stage of the software product, whereas the 'Static code metrics' sub-entity 328 may correspond to the development stage of the software product. Although not shown, the 'Security' entity 210 may further include one or more sub-entities that may correspond to the post-deployment monitoring stage of the software product.

The 'Container scan' sub-entity 324 may include a twelfth set of standard attributes, namely, 'Scan date', 'Registry', 'Tag', and 'Repository'. Thus, attribute values of the twelfth set of standard attributes (e.g., of the 'Container scan' sub-entity 324) may correspond to data associated with docker scans. Further, the 'Container vulnerability' sub-entity 326 may include a thirteenth set of standard attributes, namely, 'Container scan ID', 'Scan date', 'CVE ID', 'CVSS information', 'Category', 'Severity', and 'Vulnerability result', where CVE corresponds to common vulnerabilities and exposures, and CVSS corresponds to common vulnerability scoring system. Thus, attribute values of the thirteenth set of standard attributes (e.g., of the 'Container vulnerability' sub-entity 326) may correspond to data associated with vulnerabilities detected in the docker scans. Similarly, the 'Static code metrics' sub-entity 328 may include a fourteenth set of standard attributes, namely, 'Project ID', 'Project key', 'Analyzed on', 'Lines of code', 'Violations', 'Issues', 'Coverage', 'Vulnerabilities', 'Bugs', and 'Quality gate'. Thus, attribute values of the fourteenth set of standard attributes (e.g., of the 'Static code metrics' sub-entity 328) may correspond to data associated with scan results. The twelfth through fourteenth sets of standard attributes may be collectively referred to as a "fifth plurality of standard attributes". Each of the afore-mentioned standard attributes may be associated with at least one of the plurality of stages of the SDLC of the software product. For the 'Security' entity 210, each of the twelfth and thirteenth sets of standard attributes may be associated with the deployment stage of the software product, whereas each standard attribute of the fourteenth set of standard attributes may be associated with the development stage of the software product.

Figure 3F:
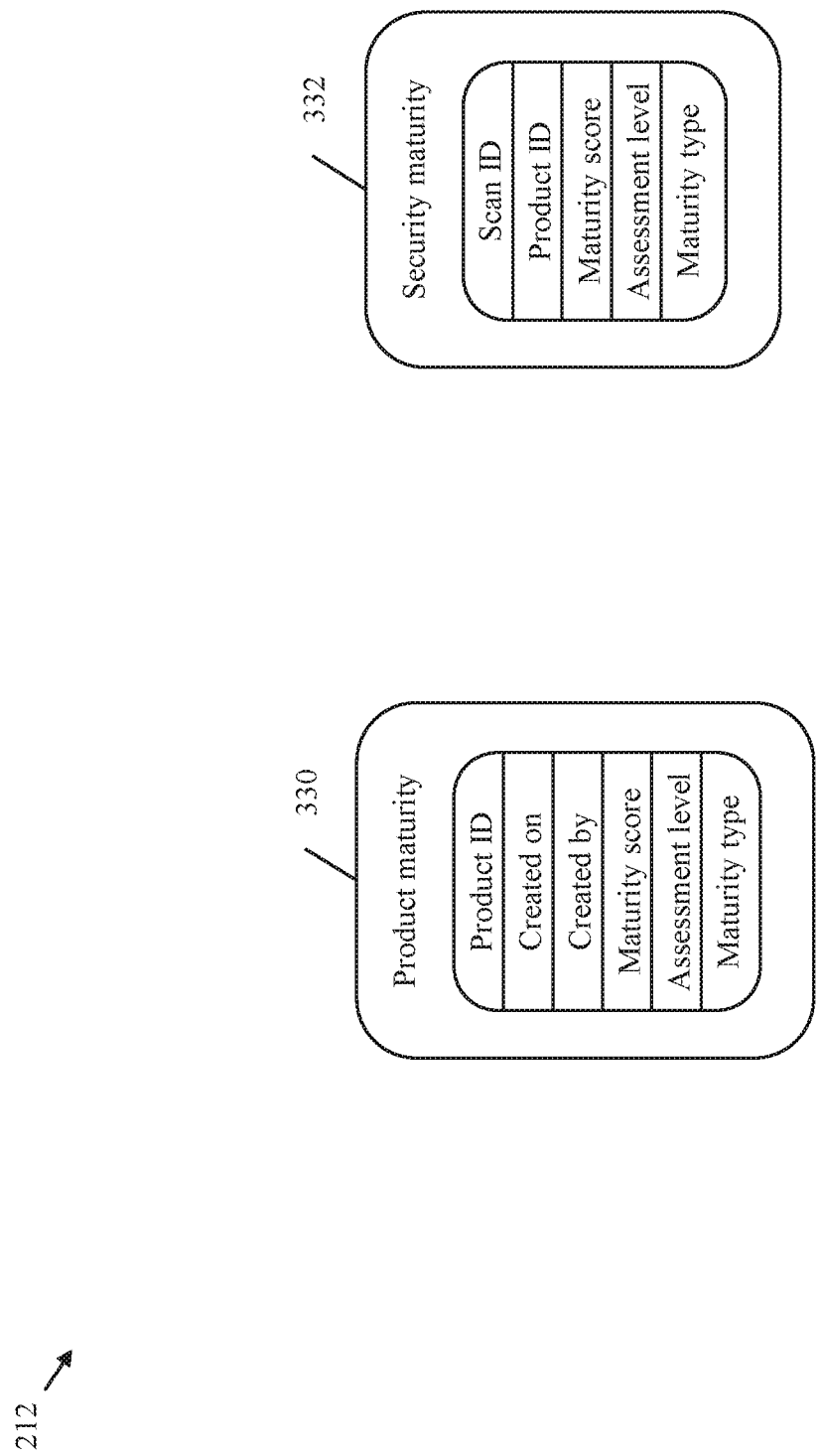

Referring now to FIG. 3F, in a non-limiting example, it is assumed that the 'Maturity' entity 212 may include a 'Product maturity' sub-entity 330 and a 'Security maturity' sub-entity 332. The 'Product maturity' sub-entity 330 and the 'Security maturity' sub-entity 332 may be collectively referred to as a "sixth plurality of sub-entities 330 and 332". Each of the afore-mentioned sub-entities may correspond to at least one of the plurality of stages of the SDLC of the software product. For example, both the 'Product maturity' sub-entity 330 and the 'Security maturity' sub-entity 332 may correspond to the management stage of the software product.

The 'Product maturity' sub-entity 330 may include a fifteenth set of standard attributes, namely 'Product ID', 'Created on', 'Created by', 'Maturity score', 'Assessment level', and 'Maturity type'. Thus, attribute values of the fifteenth set of standard attributes (e.g., of the 'Product maturity' sub-entity 330) may correspond to data associated with maturity scores of products. Similarly, the 'Security maturity' sub-entity 332 may include a sixteenth set of standard attributes, namely 'Scan ID', 'Product ID', 'Maturity score', 'Assessment level', and 'Maturity type'. Thus, attribute values of the sixteenth set of standard attributes (e.g., of the 'Security maturity' sub-entity 332) may correspond to data associated with maturity scores of security processes. The fifteenth and sixteenth sets of standard attributes may be collectively referred to as a "sixth plurality of standard attributes". Each of the afore-mentioned standard attributes may be associated with at least one of the plurality of stages of the SDLC of the software product. For the 'Maturity' entity 212, each of the sixth plurality of standard attributes may be associated with the management stage of the software product.

It will be apparent to a person skilled in the art that the sub-entities illustrated in FIGS. 3A-3F are exemplary. In actual implementation, additional and/or different sub-entities, each corresponding to at least one of the definition, the design, the development, the deployment, the post-deployment monitoring, and the management of the software product, may be utilized, without deviating from the scope of the disclosure. Similarly, it will be apparent to a person skilled in the art that the standard attributes illustrated in FIGS. 3A-3F are exemplary. In actual implementation, additional and/or different standard attributes, each associated with at least one of the definition, the design, the development, the deployment, the post-deployment monitoring, and the management of the software product, may be utilized, without deviating from the scope of the disclosure.

Each of the plurality of entities 200 may be associated with at least one data model of the plurality of data models. For the sake of ongoing discussion, the plurality of data models includes first through sixth data models, and the first through sixth entities may be associated with the first through sixth data models, respectively. The first through sixth data models (e.g., data models for the 'Application' entity 202, the 'DevOps' entity 204, the 'Infrastructure' entity 206, the 'Business' entity 208, the 'Security' entity 210, and the 'Maturity' entity 212) may thus include the first through sixth pluralities of standard attributes, respectively. Further, each data model has the standard data format, which is defined by the standard attributes included therein. Various standard attributes included in the first through sixth data models are updated (e.g., populated) based on the data collected from the plurality of technologies 114. The updated data models are then utilized to generate the unified data model.

Figure 4:
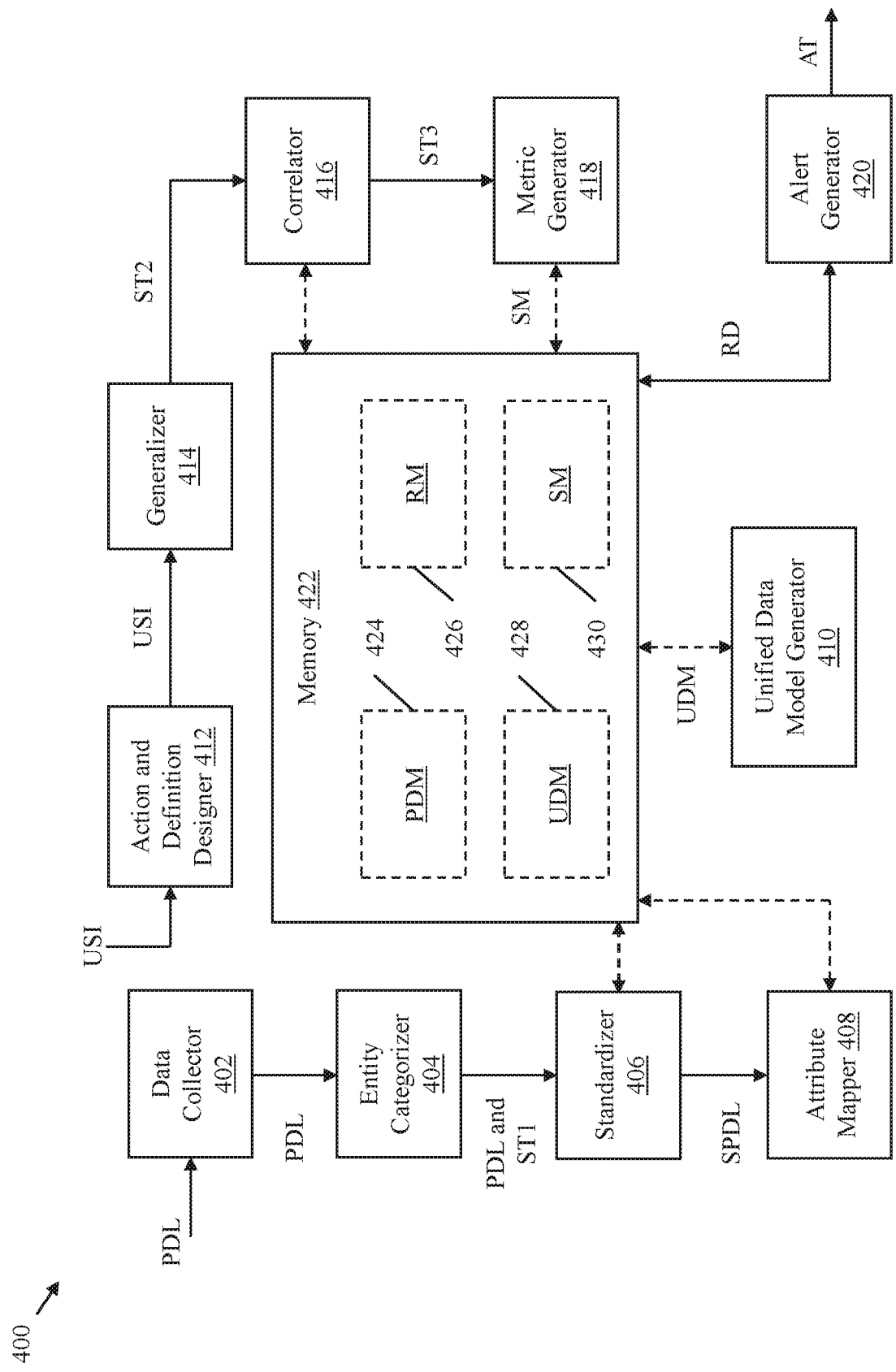
FIG. 4 is a schematic block diagram that illustrates an architecture of a service application of the system environment of FIG. 1, in accordance with an exemplary embodiment of the disclosure.

FIG. 4 is a schematic block diagram that illustrates an architecture 400 of the service application 112, in accordance with an exemplary embodiment of the disclosure. The architecture 400 is shown to include a data collector 402, an entity categorizer 404, a standardizer 406, an attribute mapper 408, a unified data model generator 410, an action and definition designer 412, a generalizer 414, a correlator 416, a metric generator 418, and an alert generator 420.

The architecture 400 is further shown to include a memory 422 that may be configured to store the plurality of data models associated with the plurality of entities 200. The plurality of data models is hereinafter referred to and designated as the "plurality of data models PDM" and is represented by a dotted box 424 in FIG. 4. The memory 422 may be further configured to store the relationship matrix. The relationship matrix is hereinafter referred to and designated as the "relationship matrix RM" and is represented by a dotted box 426 in FIG. 4. Although not shown, the architecture 400 may additionally include a relationship matrix generator that may be configured to generate the relationship matrix RM and store the relationship matrix RM in the memory 422. The relationship matrix generator may be configured to identify or determine relationships between entities or standard attributes based on a set of algorithms. Further, in one embodiment, the relationship matrix generator may present the identified relationships to the plurality of users. The relationship matrix generator may be further configured to retain or discard the identified relationships based on acceptance or rejection by the plurality of users. The relationship matrix generator may generate the relationship matrix RM representing the identified relationships between the entities.

The data collector 402 may be coupled to the plurality of platform servers 104. The data collector 402 may include suitable logic, circuitry, interfaces, and/or code, executed by the circuitry, that may be configured to perform one or more operations. For example, the data collector 402 may be configured to collect a plurality of data logs PDL from the plurality of technologies 114. In an example, a data log collected from each technology of the plurality of technologies 114 may correspond to a portion of the entire data generated by the corresponding technology. In another example, the data log collected from each technology of the plurality of technologies 114 may correspond to the entire data generated by the corresponding technology. Further, the plurality of data logs PDL may correspond to raw machine-generated data. The data collector 402 may implement various application programming interfaces (APIs) for collecting the plurality of data logs PDL from the plurality of technologies 114.

Each of the plurality of technologies 114 is associated with at least one of the plurality of stages of the SDLC of the software product. Further, the collected plurality of data logs PDL may be in formats that are specific to the associated technologies. Each collected data log may include a plurality of technology-specific attributes and a plurality of attribute values for the plurality of technology-specific attributes. Each technology-specific attribute is associated with at least one of the plurality of stages of the SDLC of the software product. For the sake of simplicity, it is assumed that a first data log (shown later in FIG. 5A) is collected from the first technology 114a, a second data log (not shown) is collected from the second technology 114b, and a third data log (not shown) is collected from the third technology 114c. However, it will be apparent to a person skilled in the art that, in actual implementation, any number of data logs may be collected from the plurality of technologies 114, without deviating from the scope of the disclosure.

The entity categorizer 404 may be coupled to the data collector 402 and the memory 422. The data collector 402 may include suitable logic, circuitry, interfaces, and/or code, executed by the circuitry, that may be configured to perform one or more operations. For example, the entity categorizer 404 may be configured to receive the collected plurality of data logs PDL from the data collector 402. Further, the entity categorizer 404 may be configured to identify, from the plurality of entities 200, a set of entities associated with each of the collected plurality of data logs PDL. In an embodiment, the entity categorizer 404 may be coupled to a buffer memory (not shown) that may store a set of predefined criteria that may be utilized by the entity categorizer 404 for identifying the set of entities for each collected data log. In another embodiment, the entity categorizer 404 may be configured to analyze each collected data log for identifying the corresponding set of entities. Further, the entity categorizer 404 may be configured to generate first status data ST1 indicative of the identified set of entities (e.g., includes information associated with the identified set of entities).

The standardizer 406 may be coupled to the entity categorizer 404 and the memory 422. The standardizer 406 may include suitable logic, circuitry, interfaces, and/or code, executed by the circuitry, that may be configured to perform one or more operations. For example, the standardizer 406 may be configured to receive the collected plurality of data logs PDL and the first status data ST1 from the entity categorizer 404. As mentioned above, each data log may have a technology-specific format, whereas each entity may have a standard data format. A format corresponds to the nomenclature of the attributes utilized in the data log. In other words, the technology-specific attributes may be similar to the standard attributes in their definition, but may have a different nomenclature. Hence, the standardizer 406 may be further configured to standardize the collected plurality of data logs PDL. Each of the collected plurality of data logs PDL is standardized based on a set of standard data formats associated with the identified set of entities.

To standardize each data log of the collected plurality of data logs PDL, the standardizer 406 may perform various operations. For example, the standardizer 406 may be further configured to segregate, based on the identified set of entities, the plurality of technology-specific attributes into one or more sets of technology-specific attributes such that each of the one or more sets of technology-specific attributes is associated with one of the set of entities. Further, the standardizer 406 may be configured to identify one or more sets of standard attributes corresponding to the one or more sets of technology-specific attributes, respectively. Each of the one or more sets of standard attributes is associated with an entity of the identified set of entities and is identified from the plurality of standard attributes associated with the corresponding entity. Each of the one or more sets of standard attributes includes one or more subsets of standard attributes associated with one or more sub-entities of the corresponding plurality of sub-entities, respectively. The standardizer 406 identifies the one or more sets of standard attributes by accessing the plurality of data models PDM stored in the memory 422. Further, each of the one or more sets of standard attributes has a standard data format of the set of standard data formats. The standardizer 406 may be further configured to convert each of the one or more sets of technology-specific attributes to the corresponding set of standard attributes. Each of the one or more sets of technology-specific attributes may be converted to the corresponding set of standard attributes based on the associated standard data format. The collected plurality of data logs PDL may thus be converted (e.g., standardized) to a standardized plurality of data logs SPDL.

The attribute mapper 408 may be coupled to the standardizer 406 and the memory 422. The attribute mapper 408 may include suitable logic, circuitry, interfaces, and/or code, executed by the circuitry, that may be configured to perform one or more operations. For example, the attribute mapper 408 may be configured to receive the standardized plurality of data logs SPDL from the standardizer 406. The attribute mapper 408 may be further configured to identify, from the plurality of attribute values of each standardized data log, one or more sets of attribute values associated with the one or more sets of technology-specific attributes, respectively. Further, the attribute mapper 408 may be configured to map the identified one or more sets of attribute values to the one or more sets of standard attributes, such that the plurality of attribute values is mapped to the one or more sets of standard attributes. The attribute mapper 408 may be further configured to update the plurality of data models PDM based on the standardized plurality of data logs SPDL such that each standardized data log is utilized to update a set of data models, of the plurality of data models PDM, associated with the identified set of entities. The mapped one or more sets of attribute values (e.g., the mapped plurality of attribute values) of each standardized data log is thus utilized to update the set of data models associated with the corresponding set of entities.

The operations of the entity categorizer 404, the standardizer 406, and the attribute mapper 408 for the first data log are explained below in FIGS. 5A-5D. The operations are explained for one data log to make the description concise and clear and should not be considered a limitation of the disclosure. Similar operations may be executed on other data logs, without deviating from the scope of the disclosure.

FIGS. 5A-5D are schematic diagrams that illustrate data model update based on the first data log, in accordance with an exemplary embodiment of the disclosure.

Referring to FIG. 5A, a first diagram 500A illustrates the first data log (hereinafter referred to and designated as the "first data log DL1"). The first data log DL1 may include first through eighth technology-specific attributes 502a-502h, namely, 'Name of job', 'Build reference number', 'Time of job', 'Stage identification number', 'Name of stage', 'Commit identification number', 'Date of scan', and 'Vulnerability score', respectively. In an embodiment, the first data log DL1 may be collected from Jenkins® during the development or deployment stage of the software product. Each of the first through eighth technology-specific attributes 502a-502h are associated with at least one of the plurality of stages of the SDLC of the software product. For example, 'Name of job', 'Build reference number', 'Time of job', 'Stage identification number', 'Name of stage', 'Date of scan', and 'Vulnerability score' may be associated with the deployment stage of the software product, whereas 'Commit identification number' may be associated with the development stage of the software product.

The first data log DL1 may further include first through eighth attribute values for the first through eighth technology-specific attributes 502a-502h, respectively. As illustrated in FIG. 5A, the first through third attribute values for 'Name of job', 'Build reference number', and 'Time of job' correspond to 'Name1', '122', and '127000', respectively. In such a scenario, a unit associated with 'Time of job' may be milliseconds. Similarly, the fourth through eighth attribute values for 'Stage identification number', 'Name of stage', 'Commit identification number', 'Date of scan', and 'Vulnerability score' correspond to '1', 'Name2', '5470fD', '16595', and '3', respectively.

It will be apparent to a person skilled in the art that the first data log DL1 illustrated in FIG. 5A is exemplary, and the scope of the disclosure is not limited to it. In various other embodiments, the first data log DL1 may have additional and/or different technology-specific attributes and associated attribute values, without deviating from the scope of the disclosure. Further, the second and third data logs may be similar to the first data log DL1, with the technology-specific attributes varying based on the second and third technologies 114b and 114c, respectively.

Figure 5B:
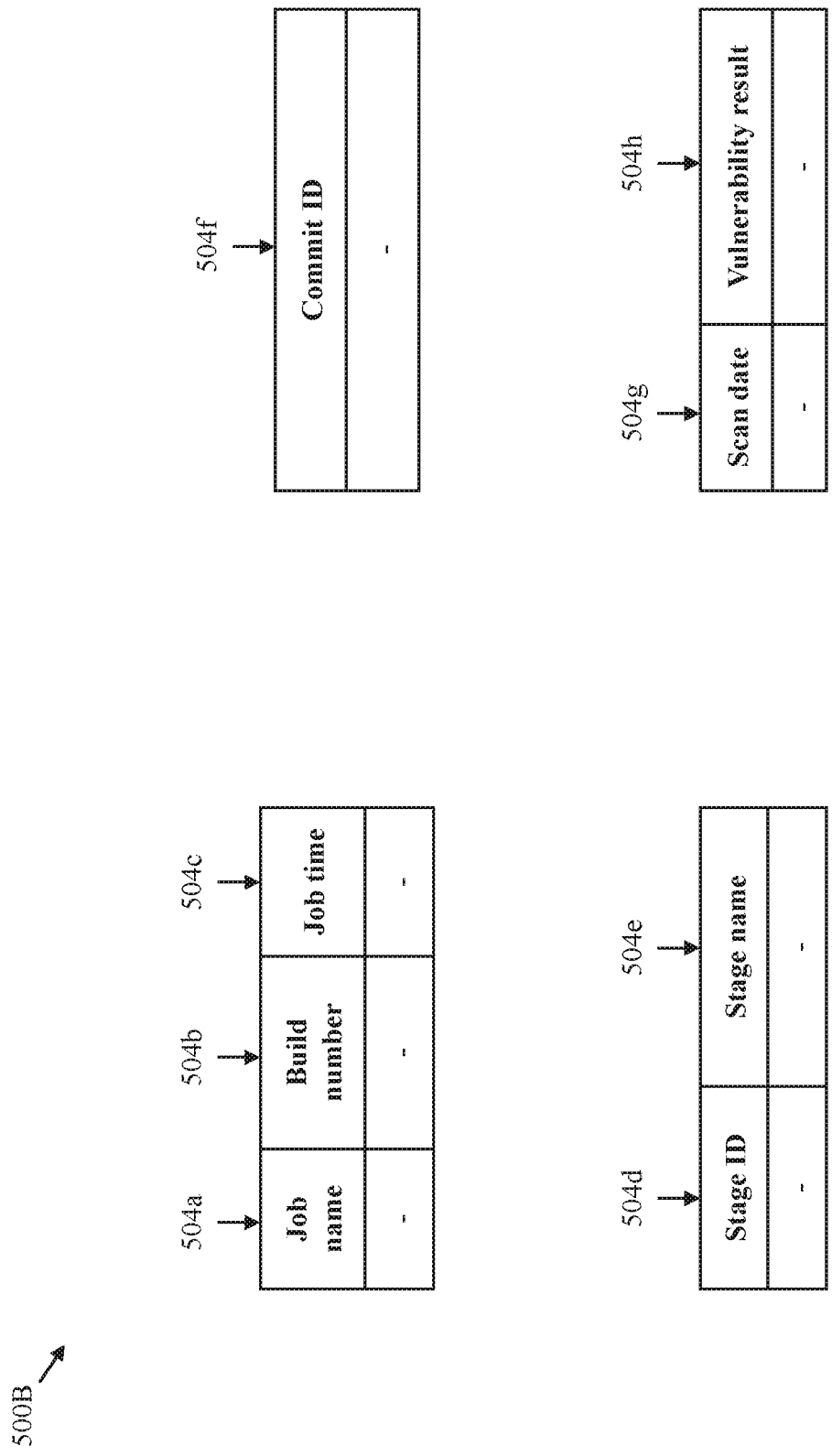

Referring to FIG. 5B, a second diagram 500B illustrates various standard attributes identified for the first data log DL1. The entity categorizer 404 may identify, from the plurality of entities 200, two entities, namely, the 'DevOps' entity 204 and the 'Security' entity 210 associated with the first data log DL1. Thus, the 'DevOps' entity 204 and the 'Security' entity 210 may correspond to the identified set of entities for the first data log DL1. The standardizer 406 may segregate, based on the identified 'DevOps' entity 204 and the identified 'Security' entity 210, the first through eighth technology-specific attributes 502a-502h into two sets of technology-specific attributes with each set of technology-specific attributes being associated with one entity. In a non-limiting example, 'Name of job', 'Build reference number', 'Time of job', 'Stage identification number', 'Name of stage', and 'Commit identification number' may be segregated as technology-specific attributes associated with the 'DevOps' entity 204, and 'Date of scan' and 'Vulnerability score' may be segregated as technology-specific attributes associated with the 'Security' entity 210.

The standardizer 406 may identify two sets of standard attributes corresponding to the two sets of technology-specific attributes of the first data log DL1, respectively. In a non-limiting example, the standardizer 406 may identify first through sixth standard attributes 504a-504f, namely, 'Job name', 'Build number', 'Job time', 'Stage ID', 'Stage name', and 'Commit ID', corresponding to the first through sixth technology-specific attributes 502a-502f (e.g., 'Name of job', 'Build reference number', 'Time of job', 'Stage identification number', 'Name of stage', and 'Commit identification number'), respectively. Such a set of standard attributes is associated with the 'DevOps' entity 204 and is identified from the second plurality of standard attributes. Similarly, the standardizer 406 may identify seventh and eighth standard attributes 504g and 504h, namely, 'Scan date' and 'Vulnerability result' corresponding to seventh and eighth technology-specific attributes 502g and 502h (e.g., 'Date of scan' and 'Vulnerability score'), respectively. Such a set of standard attributes is associated with the 'Security' entity 210 and is identified from the fifth plurality of standard attributes. Further, for the 'DevOps' entity 204, 'Job name', 'Build number', and 'Job time' are associated with the 'Build jobs' sub-entity 312, 'Stage ID' and 'Stage name' are associated with the 'Build stages' sub-entity 314, and 'Commit ID' is associated with the 'Commit request' sub-entity 308. Similarly, for the 'Security' entity 210, 'Scan date' and 'Vulnerability result' are associated with the 'Container vulnerability' sub-entity 326. Thus, each identified set of standard attributes includes one or more subsets of standard attributes associated with one or more sub-entities of the corresponding plurality of sub-entities, respectively. At such an instance, the attribute values of the identified standard attributes may be empty.

Figure 5C:
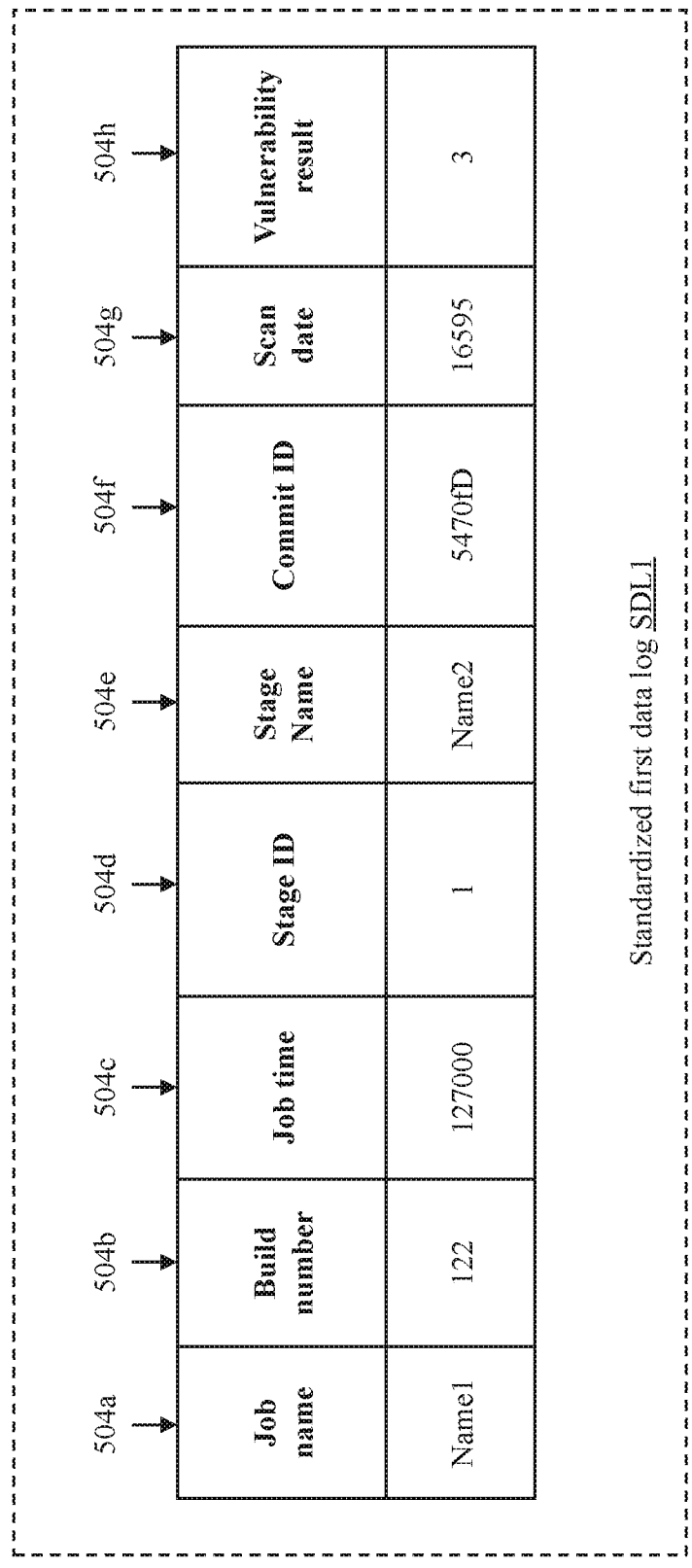

Referring to FIG. 5C, a third diagram 500C illustrates a standardized first data log SDL1. The standardizer 406 may convert each technology-specific attribute to the corresponding standard attribute. For example, 'Name of job' is converted to 'Job Name', 'Build reference number' is converted to 'Build number', and 'Time of job' is converted to 'Job time'. Similarly, 'Stage identification number' is converted to 'Stage ID' and 'Name of stage' is converted to 'Stage name'. Further, 'Commit identification number' is converted to 'Commit ID'. Additionally, 'Date of scan' is converted to 'Scan date' and 'Vulnerability score' is converted to 'Vulnerability result'. The first data log DL1 is thus standardized (e.g., is converted to the standardized first data log SDL1).

Figure 5D:
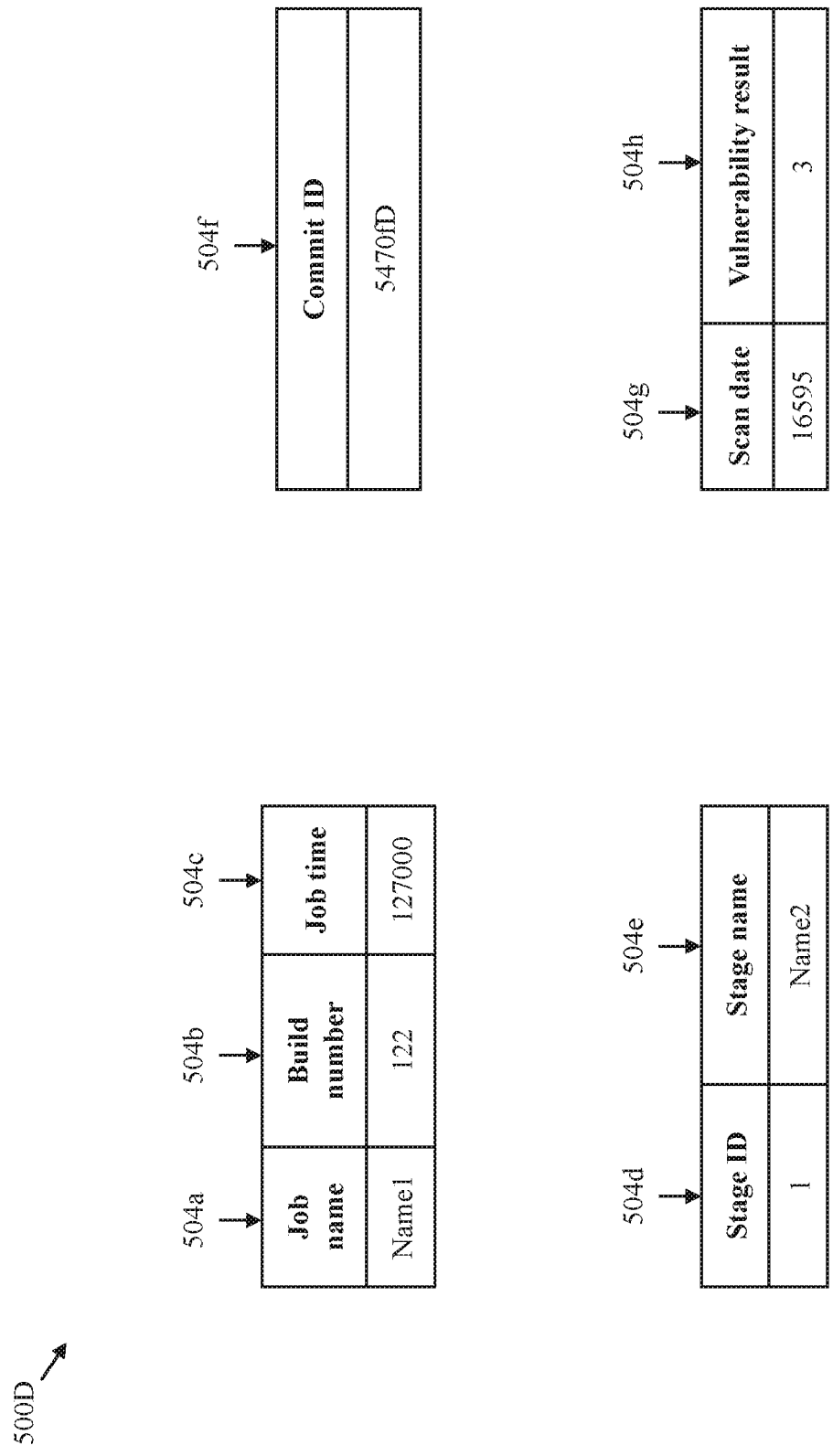

Referring to FIG. 5D, a fourth diagram 500D illustrates the population of the identified standard attributes with the first through eighth attribute values. The attribute mapper 408 may map an attribute value of each converted technology-specific attribute to the corresponding standard attribute, such that the first through eighth attribute values are mapped to the identified standard attributes. Thus, the first through third attribute values (e.g., 'Name1', '122', and '127000') are mapped to 'Job name', 'Build number', and 'Job time', respectively. Similarly, the fourth through eighth attribute values (e.g., '1', 'Name2', '5470fD', '16595', and '3') are mapped to 'Stage ID', 'Stage name', 'Commit ID', 'Scan date', and 'Vulnerability result', respectively. The attribute mapper 408 may update the second and fifth data models based on the standardized first data log SDL1. Thus, the standard attributes within the second and fifth data models are populated with the first through eighth attribute values of the standardized first data log SDL1. In other words, the identified standard attributes are populated with the first through eighth attribute values of the standardized first data log SDL1. The mapped attribute values of the standardized first data log SDL1 are thus utilized to update the data models associated with the 'DevOps' entity 204 and the 'Security' entity 210.

Each collected data log may be utilized to update one or more data models in the similar manner as described above.

Referring back to FIG. 4, the unified data model generator 410 may be coupled to the memory 422. The unified data model generator 410 may include suitable logic, circuitry, interfaces, and/or code, executed by the circuitry, that may be configured to perform one or more operations. For example, the unified data model generator 410 may be configured to retrieve the updated plurality of data models PDM and the relationship matrix RM from the memory 422. Based on the updated plurality of data models PDM and the relationship matrix RM, the unified data model generator 410 may be further configured to generate the unified data model that is indicative of the correlation between the plurality of entities 200. The unified data model is hereinafter referred to and designated as the "unified data model UDM" and is represented by a dotted box 428 in FIG. 4. The unified data model UDM includes the plurality of standard attributes of each of the plurality of data models PDM and a set of attribute values mapped to each standard attribute of each data model. In other words, the unified data model UDM includes the first through sixth pluralities of standard attributes, with each standard attribute of the first through sixth pluralities of standard attributes having at least one attribute value mapped thereto.

The correlation between the plurality of entities 200 corresponds to one or more standard attributes associated with one entity of the plurality of entities 200 being correlated with one or more standard attributes associated with at least one remaining entity of the plurality of entities 200. For example, the correlation between the 'Application' entity 202, the 'DevOps' entity 204, the 'Infrastructure' entity 206, the 'Business' entity 208, the 'Security' entity 210, and the 'Maturity' entity 212 corresponds to the correlation of one or more standard attributes of the first plurality of standard attributes of the 'Application' entity 202 with one or more standard attributes of each of the second through sixth pluralities of standard attributes of the 'DevOps' entity 204, the 'Infrastructure' entity 206, the 'Business' entity 208, the 'Security' entity 210, and the 'Maturity' entity 212, respectively.

In a non-limiting example, the correlation between the 'Business' entity 208 and the 'Application' entity 202 may indicate various agile issues and associated status (e.g., open and closed states) for various software products. In such a scenario, standard attributes of the 'Platform product' sub-entity 320 may be correlated with standard attributes of the 'Agile issue details' sub-entity 304. For example, 'Product name' of the 'Platform product' sub-entity 320 may be correlated with 'Issue key' and 'Status' of the 'Agile issue details' sub-entity 304. Similarly, the correlation between the 'Business' entity 208, the 'Application' entity 202, and the 'DevOps' entity 204 may indicate code commits and builds for various products. In such a scenario, standard attributes of the 'Platform product' sub-entity 320, the 'Agile issue details' sub-entity 304, the 'Commit request' sub-entity 308, and the 'Build jobs' sub-entity 312 may be correlated. For example, 'Product name' of the 'Platform product' sub-entity 320, 'Issue key' and 'Status' of the 'Agile issue details' sub-entity 304, 'Commit ID' and 'Repository ID' of the 'Commit request' sub-entity 308, and 'Build number' and 'Job name' of the 'Build jobs' sub-entity 312 may be correlated.

The correlation between the 'Business' entity 208, the 'Application' entity 202, the 'DevOps' entity 204, the 'Security' entity 210, and the 'Infrastructure' entity 206 may indicate vulnerabilities and infrastructure threats for builds of various products. In such a scenario, standard attributes of the 'Platform product' sub-entity 320, the 'Agile issue details' sub-entity 304, the 'Commit request' sub-entity 308, the 'Build jobs' sub-entity 312, the 'Container vulnerability' sub-entity 326, and the 'Cluster details' sub-entity 316 may be correlated. For example, 'Product name' of the 'Platform product' sub-entity 320, 'Issue key' and 'Status' of the 'Agile issue details' sub-entity 304, 'Commit ID' and 'Repository ID' of the 'Commit request' sub-entity 308, and 'Build number' and 'Job name' of the 'Build jobs' sub-entity 312, 'Vulnerability result' of the 'Container vulnerability' sub-entity 326, and 'Cluster name' of the 'Cluster details' sub-entity 316 may be correlated. Further, the correlation between the 'Business' entity 208 and the 'Maturity' entity 212 may indicate maturity scores of various processes associated with various products. In such a scenario, standard attributes of the 'Platform product' sub-entity 320 and the 'Product maturity' sub-entity 330 may be correlated. For example, 'Product name' of the 'Platform product' sub-entity 320 may be correlated with 'Maturity score' of the 'Product maturity' sub-entity 330.

The unified data model UDM may then be utilized to determine the insight associated with the software product. The determination of the insight is explained below.

The action and definition designer 412 may include suitable logic, circuitry, interfaces, and/or code, executed by the circuitry, that may be configured to perform one or more operations. For example, the action and definition designer 412 may be configured to receive the user input (hereinafter referred to and designated as the "user input USI") from the first user device 102a of the first user. The action and definition designer 412 may provide a platform for the first user to enter the user input USI. The user input USI may be for generating a set of metrics SM. The set of metrics SM is represented by a dotted box 430 in FIG. 4. The user input USI may include an action portion and a definition portion. In an example, the definition portion may include headers associated with one or more entities, whereas the action portion may include values of the headers.

The generalizer 414 may be coupled to the action and definition designer 412. The generalizer 414 may include suitable logic, circuitry, interfaces, and/or code, executed by the circuitry, that may be configured to perform one or more operations. For example, the generalizer 414 may be configured to receive the user input USI from the action and definition designer 412. The generalizer 414 may be further configured to identify, from the plurality of entities 200, two or more entities associated with the user input USI. Further, the generalizer 414 may be configured to generate second status data ST2 indicative of the identified two or more entities (e.g., includes information associated with the identified two or more entities).

The correlator 416 may be coupled to the generalizer 414 and the memory 422. The correlator 416 may include suitable logic, circuitry, interfaces, and/or code, executed by the circuitry, that may be configured to perform one or more operations. For example, the correlator 416 may be configured to receive the second status data ST2 from the generalizer 414. The correlator 416 may be further configured to identify, for the two or more entities, from the corresponding pluralities of standard attributes, two or more sets of standard attributes. The correlator 416 may be configured to access the unified data model UDM to identify the two or more sets of standard attributes. Each set of standard attributes is related to the remaining sets of standard attributes in the unified data model UDM. Further, the correlator 416 may be configured to generate third status data ST3 indicative of the two or more sets of standard attributes (e.g., includes information associated with the identified two or more sets of standard attributes).

The metric generator 418 may be coupled to the correlator 416 and the memory 422. The metric generator 418 may include suitable logic, circuitry, interfaces, and/or code, executed by the circuitry, that may be configured to perform one or more operations. For example, the metric generator 418 may be configured to receive the third status data ST3 from the correlator 416. The metric generator 418 may be further configured to generate a query (not shown) based on the two or more sets of standard attributes. The query may correspond to a structured query language (SQL) query. The metric generator 418 may be further configured to validate the query based on the unified data model UDM. To validate the query, the metric generator 418 may be further configured to execute the query on the unified data model UDM to retrieve test data (not shown) from the unified data model UDM, and evaluate the retrieved test data. Based on the validation of the query and the two or more sets of standard attributes, the metric generator 418 may be further configured to generate the set of metrics SM. In other words, on successful validation of the query, the metric generator 418 may generate the set of metrics SM that includes the two or more sets of standard attributes. The metric generator 418 may be further configured to store the set of metrics SM in the memory 422.

In a non-limiting example, the definition portion of the user input USI may include selection of various headers associated with the 'Business' entity 208 and the 'Application' entity 202. Further, the action portion of the user input USI may include selection of a product (e.g., the software product) for the 'Business' definition and selection of a feature (e.g., agile issues) for the 'Application' definition. Based on such user input USI, the generalizer 414 may identify that the 'Business' entity 208 and the 'Application' entity 202 are associated with the user input USI. The entities may be identified based on the definition portion of the user input USI. Further, the correlator 416 may identify standard attributes (e.g., 'Product name' for the 'Business' entity 208 and 'Issue key' and 'Status' for the 'Application' entity 202) to be correlated. The standard attributes may be identified based on the action portion of the user input USI. In an example, the number of issue keys and associated status for each product may be obtained based on the correlation of the standard attributes. Further, the metric generator 418 may generate the query based on the standard attributes (e.g., 'Product name', 'Issue key', and 'Status') and validate the query based on the unified data model UDM. Based on the validation of the query, the metric generator 418 may generate the set of metrics SM that includes the standard attributes (e.g., 'Product name', 'Issue key', and 'Status'), and store the set of metrics SM in the memory 422. The set of metrics SM is thus indicative of various agile issues and associated status (e.g., open and closed) for various software products.

It will be apparent to a person skilled in the art that various other sets of metrics may be generated in the similar manner as described above. For example, another set of metrics, indicative of code commits and builds for various products, may be generated based on the correlation between the 'Business' entity 208, the 'Application' entity 202, and the 'DevOps' entity 204. Similarly, yet another set of metrics, indicative of vulnerabilities and infrastructure threats for builds of various products, may be generated based on the correlation between the 'Business' entity 208, the 'Application' entity 202, the 'DevOps' entity 204, the 'Security' entity 210, and the 'Infrastructure' entity 206. Further, yet another set of metrics, indicative of maturity scores of processes associated with various products, may be generated based on the correlation between the 'Business' entity 208 and the 'Maturity' entity 212. Such sets of metrics may be correlated to further refine the insight associated with the software product.

The alert generator 420 may be coupled to the memory 422. The alert generator 420 may include suitable logic, circuitry, interfaces, and/or code, executed by the circuitry, that may be configured to perform one or more operations. For example, the alert generator 420 may be configured to determine, based on the set of metrics SM and the unified data model UDM, the insight associated with the software product. The set of metrics SM is indicative of the two or more sets of standard attributes, associated with the two or more entities of the plurality of entities 200, respectively required to determine the insight. To determine the insight associated with the software product, the alert generator 420 may execute various operations. For example, the alert generator 420 may be further configured to retrieve the set of metrics SM from the memory 422. Further, the alert generator 420 may be configured to generate the query based on the set of metrics SM. The query is indicative of the correlation between the two or more entities. The alert generator 420 may be further configured to execute the query on the unified data model UDM, and retrieve, from the unified data model UDM based on the query, response data RD that includes two or more sets of attribute values of the two or more sets of standard attributes, respectively. Further, the alert generator 420 may be configured to process the response data RD. The insight associated with the software product may be determined based on the processed response data RD.

Based on the determined insight, the alert generator 420 may be further configured to execute an automated action. In other words, the alert generator 420 may execute the automated action based on the correlation indicated by the unified data model UDM. The execution of the automated action may correspond to the generation of the alert (hereinafter referred to and designated as the "alert AT") and the presentation of the alert AT on the first user device 102a. In an embodiment, based on the determined insight, the alert generator 420 may be further configured to determine a score associated with the software product. Further, the alert generator 420 may be configured to compare the determined score with a reference range such that the alert AT is generated based on the determined score not being within the reference range. The reference range may be a set of numerical values indicative of one or more aspects of the software product operating in the desired manner.

For the insight determined based on the set of metrics SM indicative of various agile issues and associated status for various products, the alert generator 420 may generate the alert AT when the determined score (e.g., a number of open agile issues in the software product) is not within the reference range. Similarly, for the insight determined based on another set of metrics indicative of code commits and builds for various products, the alert generator 420 may generate the alert AT when the determined score (e.g., a number of build failures in the software product) is not within the reference range. Further, for the insight determined based on yet another set of metrics indicative of vulnerabilities and infrastructure threats for builds of various products, the alert generator 420 may generate the alert AT when the determined score (e.g., a number of code issues in the software product) is not within the reference range. Additionally, for the insight determined based on yet another set of metrics indicative of maturity scores for various products, the alert generator 420 may generate the alert AT when the determined score (e.g., a maturity score of at least one process associated with the software product) is not within the reference range. It will be apparent to a person skilled in the art that the reference range for each aforementioned scenario may be different.

It will be apparent to a person skilled in the art that the scope of the disclosure is not limited to the aforementioned examples of alert generation. The alert AT may be generated for various other scenarios, without deviating from the scope of the disclosure.

The alert generator 420 may execute the afore-mentioned operations in a periodic manner. For example, the set of metrics SM may be associated with a predefined time interval, and the alert generator 420 may retrieve the set of metrics SM from the memory 422 to determine the insight associated with the software product periodically (e.g., on the lapse of the predefined time interval).

Although it is described that the set of metrics SM is generated based on the user input USI (e.g., custom generation), the scope of the disclosure is not limited to it. In an alternate embodiment, the set of metrics SM may be generated in a default manner and may be pre-stored in the memory 422, without deviating from the scope of the disclosure.

The scope of the disclosure is not limited to the alert generator 420 executing the automated action based on the set of metrics SM. In various other embodiments, various AI and related technologies, such as machine learning and NLP, may be utilized to determine the insights from the unified data model UDM, and in turn, for executing the automated action, without deviating from the scope of the disclosure. In such a scenario, the alert generator 420 may be an AI circuit.

The memory 422 may include suitable logic, circuitry, interfaces, and/or code, executable by the circuitry, to store data required for the analysis of the software product. For example, the memory 422 may be configured to store, therein, the plurality of data models PDM, the relationship matrix RM, the unified data model UDM, and the set of metrics SM. The memory 422 further stores, therein, the user input USI received from the first user device 102a. Examples of the memory 422 may include a random-access memory (RAM), a read-only memory (ROM), a removable storage drive, a hard disk drive (HDD), a flash memory, a solid-state memory, or the like.

The identified two or more sets of standard attributes are stored as the set of metrics SM in the memory 422 to optimize storage capacity of the memory 422. However, the scope of the present disclosure is not limited to it. In various other embodiments, the validated query may be stored as the set of metrics SM in the memory 422, without deviating from the scope of the present disclosure. In such a scenario, to determine the insight, the alert generator 420 may retrieve the query (e.g., the set of metrics SM) and execute the query on the unified data model UDM.

Figure 6:
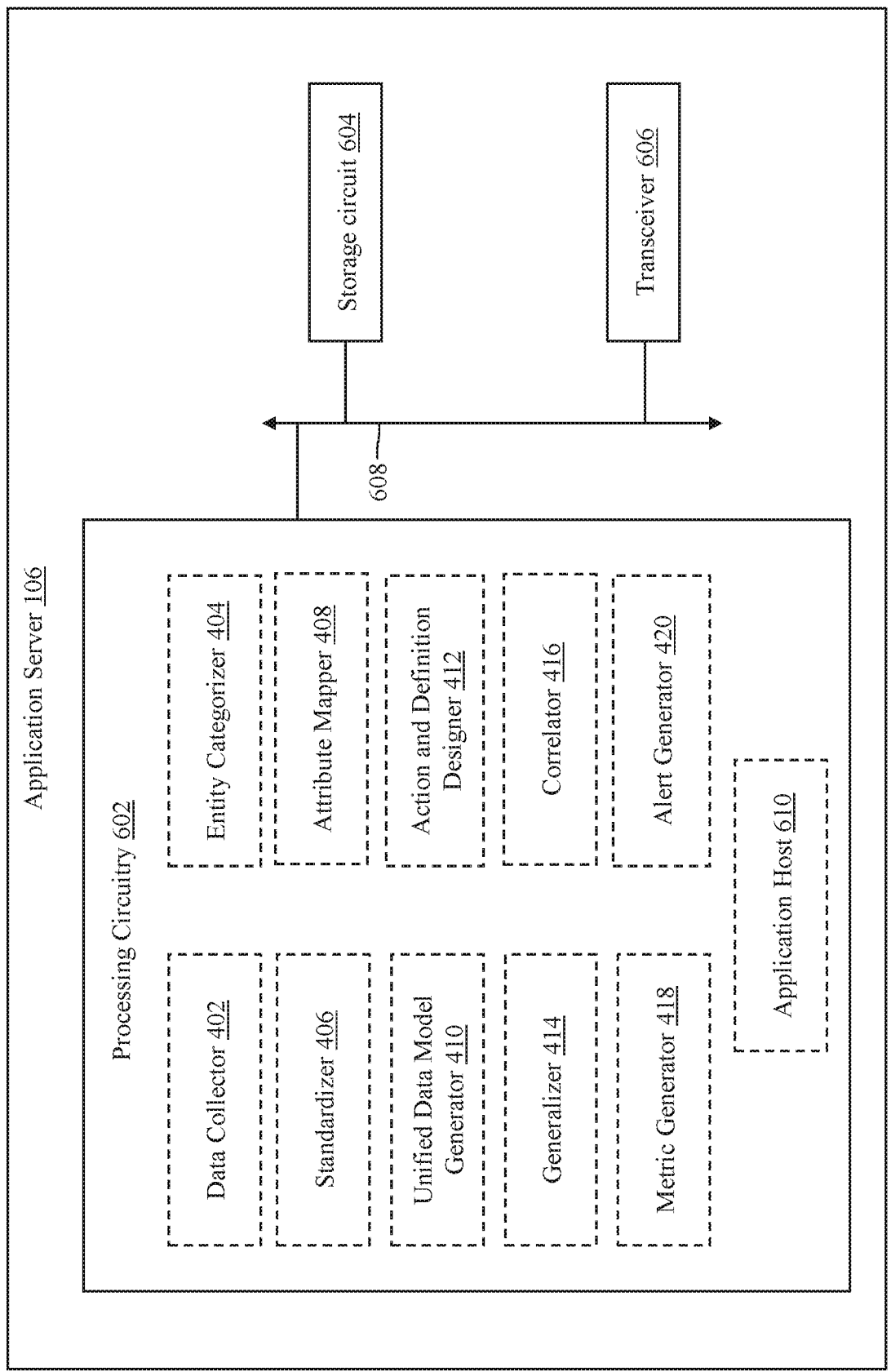
FIG. 6 is a block diagram that illustrates an application server of the system environment of FIG. 1, in accordance with an exemplary embodiment of the disclosure.

FIG. 6 is a block diagram that illustrates the application server 106, in accordance with an exemplary embodiment of the disclosure.

The application server 106 may include processing circuitry 602, a storage circuit 604, and a transceiver 606. The processing circuitry 602, the storage circuit 604, and the transceiver 606 may communicate with each other by way of a communication bus 608.

The processing circuitry 602 includes suitable logic, circuitry, interfaces, and/or code, executed by the circuitry, for facilitating the analysis of the software product. The processing circuitry 602 may include the data collector 402, the entity categorizer 404, the standardizer 406, the attribute mapper 408, the unified data model generator 410, the action and definition designer 412, the generalizer 414, the correlator 416, the metric generator 418, the alert generator 420, and an application host 610. Examples of the processing circuitry 602 may include, but are not limited to, an application-specific integrated circuit ASIC processor, a RISC processor, a CISC processor, an FPGA, and the like. The processing circuitry 602 may execute various operations for facilitating the analysis of the software product. These operations may be executed by way of the data collector 402, the entity categorizer 404, the standardizer 406, the attribute mapper 408, the unified data model generator 410, the action and definition designer 412, the generalizer 414, the correlator 416, the metric generator 418, the alert generator 420, and the application host 610.

The application host 610 may be configured to host the service application 112 that is executed on the plurality of user devices 102. Functions of the data collector 402, the entity categorizer 404, the standardizer 406, the attribute mapper 408, the unified data model generator 410, the action and definition designer 412, the generalizer 414, the correlator 416, the metric generator 418, and the alert generator 420 have already been covered in the description of earlier figures.

The storage circuit 604 may correspond to the memory 422. It will be apparent to a person skilled in the art that the scope of the disclosure is not limited to realizing the storage circuit 604 in the application server 106, as described herein. In another embodiment, the storage circuit 604 may be realized in form of a database server or a cloud storage working in conjunction with the application server 106, without departing from the scope of the disclosure.

The transceiver 606 may include suitable logic, circuitry, interfaces, and/or code, executable by the circuitry, to transmit and receive data over the communication network 110 using one or more communication network protocols. The transceiver 606 may transmit and receive requests, messages, information, and data to and/or from the plurality of user devices 102, the plurality of platform servers 104, and/or the database server 108. Examples of the transceiver 606 may include, but are not limited to, an antenna, a radio frequency transceiver, a wireless transceiver, a Bluetooth transceiver, an ethernet port, a universal serial bus (USB) port, or any other device configured to transmit and receive data.

Figure 7:
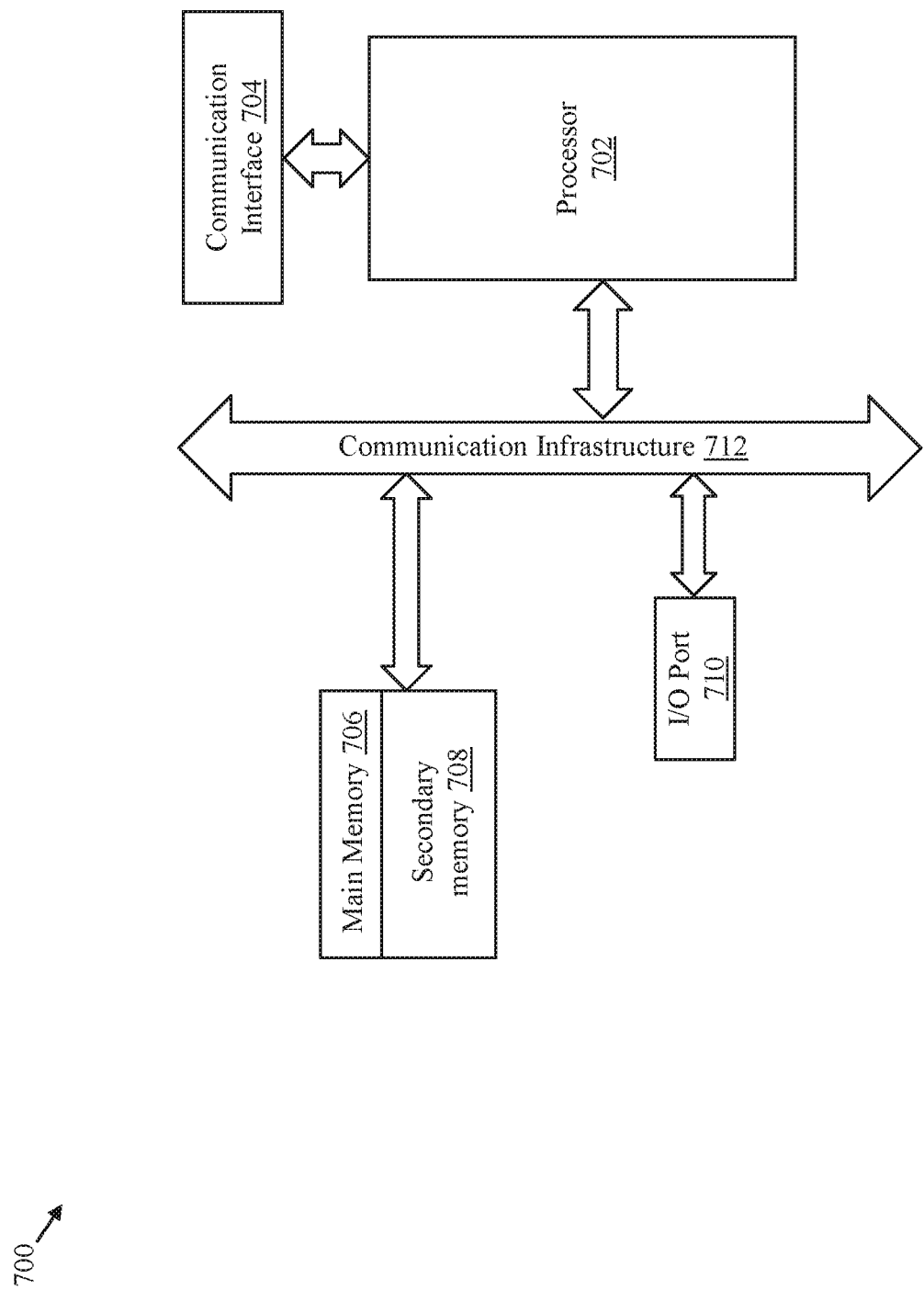
FIG. 7 is a block diagram that illustrates a system architecture of a computer system that implements the service application hosted by the application server, in accordance with an exemplary embodiment of the disclosure.

FIG. 7 is a block diagram that illustrates a system architecture of a computer system 700 that implements the service application 112 hosted by the application server 106, in accordance with an exemplary embodiment of the disclosure. An embodiment of the disclosure, or portions thereof, may be implemented as computer readable code on the computer system 700. In one example, the plurality of user devices 102, the first plurality of platform servers 104, the application server 106, and the database server 108 may be implemented in the computer system 700 using hardware, software, firmware, non-transitory computer-readable media having instructions stored thereon, or a combination thereof and may be implemented in one or more computer systems or other processing systems. Hardware, software, or any combination thereof may embody modules and components used to implement the methods of FIGS. 8A-8E.

The computer system 700 may include a processor 702 that may be a special purpose or a general-purpose processing device. The processor 702 may be a single processor or multiple processors. The processor 702 may have one or more processor cores. Further, the processor 702 may be coupled to a communication interface 704, such as a bus, a bridge, a message queue, the communication network 110, a multi-core message-passing scheme, or the like. The computer system 700 may further include a main memory 706 and a secondary memory 708. Examples of the main memory 706 may include RAM, ROM, and the like. The secondary memory 708 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer-readable recording media.

The computer system 700 may further include an input/output (I/O) port 710 and a communication infrastructure 712. The I/O port 710 may include various input and output devices that are configured to communicate with the processor 702. Examples of the input devices may include a keyboard, a mouse, a joystick, a touchscreen, a microphone, and the like. Examples of the output devices may include a display screen, a speaker, headphones, and the like. The communication infrastructure 712 may be configured to allow data to be transferred between the computer system 700 and various devices that are communicatively coupled to the computer system 700. Examples of the communication infrastructure 712 may include a modem, a network interface, i.e., an Ethernet card, a communication port, and the like. Data transferred via the communication infrastructure 712 may be signals, such as electronic, electromagnetic, optical, or other signals as will be apparent to a person skilled in the art. The signals may travel via a communications channel, such as the communication network 110, which may be configured to transmit the signals to the various devices that are communicatively coupled to the computer system 700. Examples of the communication channel may include a wired, wireless, and/or optical medium such as cable, fiber optics, a phone line, a cellular phone link, a radio frequency link, and the like. The main memory 706 and the secondary memory 708 may refer to non-transitory computer-readable mediums that may provide data that enables the computer system 700 to implement the methods of FIGS. 8A-8E.

FIGS. 8A-8E, collectively, represent a flowchart 800 that illustrates a method for facilitating analysis of the software product, in accordance with an exemplary embodiment of the disclosure.

Figure 8A:
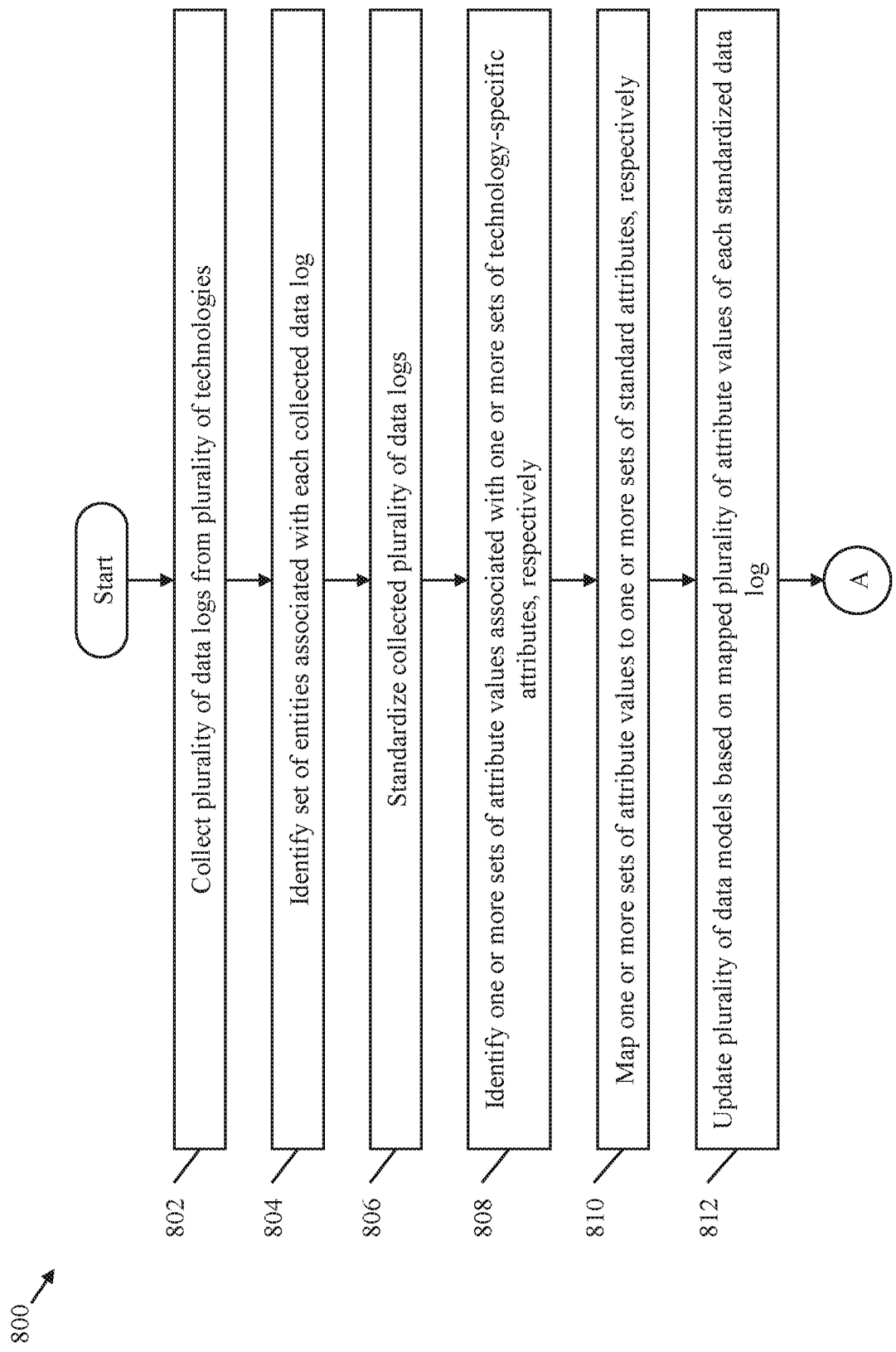
FIGS. 8A-8E, collectively, represent a flowchart that illustrates a method for facilitating analysis of the software product, in accordance with an exemplary embodiment of the disclosure.

Referring to FIG. 8A, at 802, the plurality of data logs PDL may be collected from the plurality of technologies 114. The processing circuitry 602 (e.g., the data collector 402) may collect the plurality of data logs PDL from the plurality of technologies 114. Various APIs may be implemented for collecting the plurality of data logs PDL from the plurality of technologies 114. Each collected data log may include the plurality of technology-specific attributes and the plurality of attribute values for the plurality of technology-specific attributes. At 804, the set of entities associated with each collected data log may be identified. The processing circuitry 602 (e.g., the entity categorizer 404) may identify, from the plurality of entities 200, the set of entities associated with each collected data log. At 806, the collected plurality of data logs PDL is standardized. The processing circuitry 602 (e.g., the standardizer 406) may standardize the collected plurality of data logs PDL. Each of the collected plurality of data logs PDL is standardized based on the set of standard data formats associated with the identified set of entities. Additional details for 806 are provided at, for example, FIG. 8D.

Figure 8B:
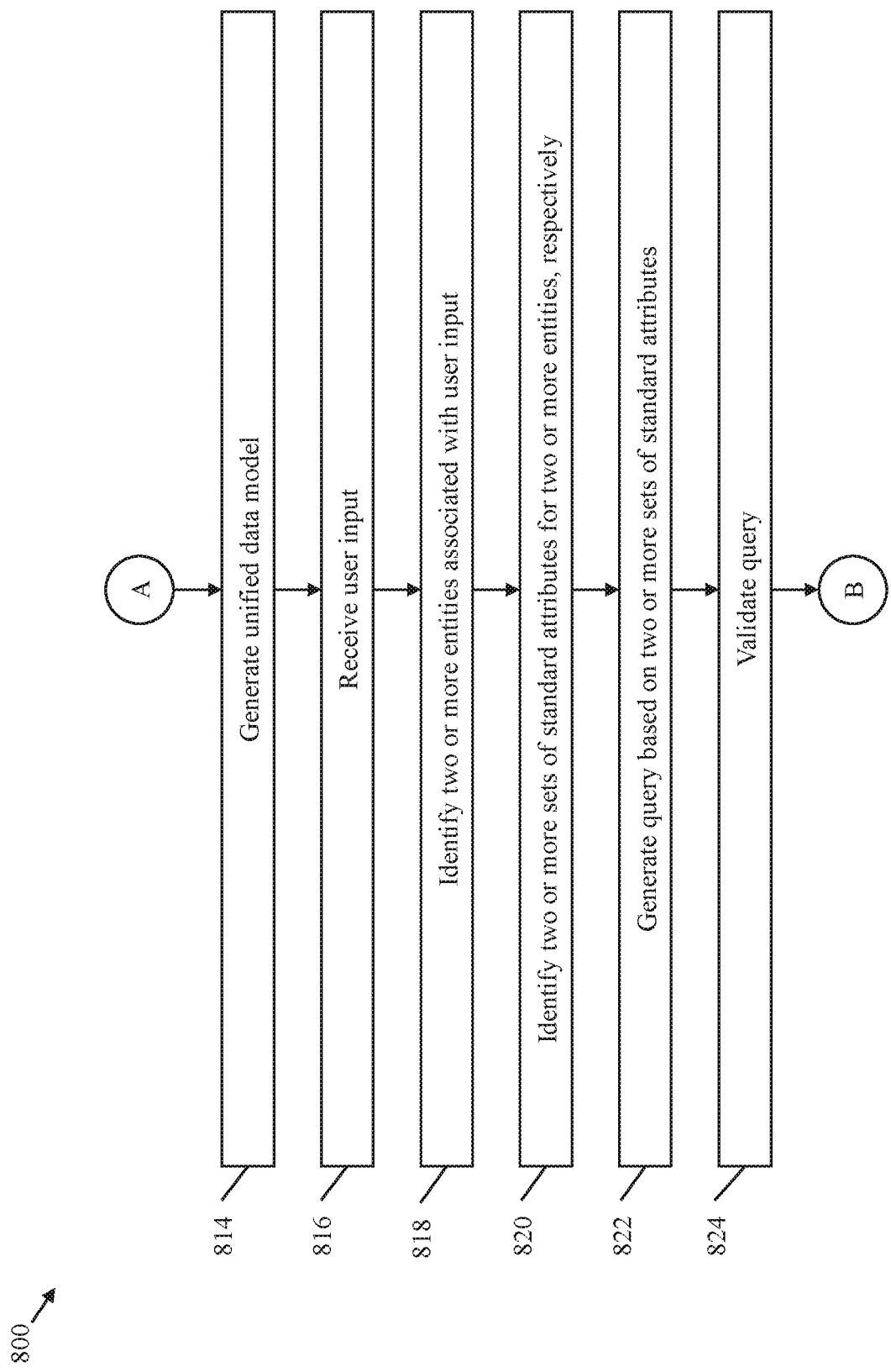
Figure 8C:
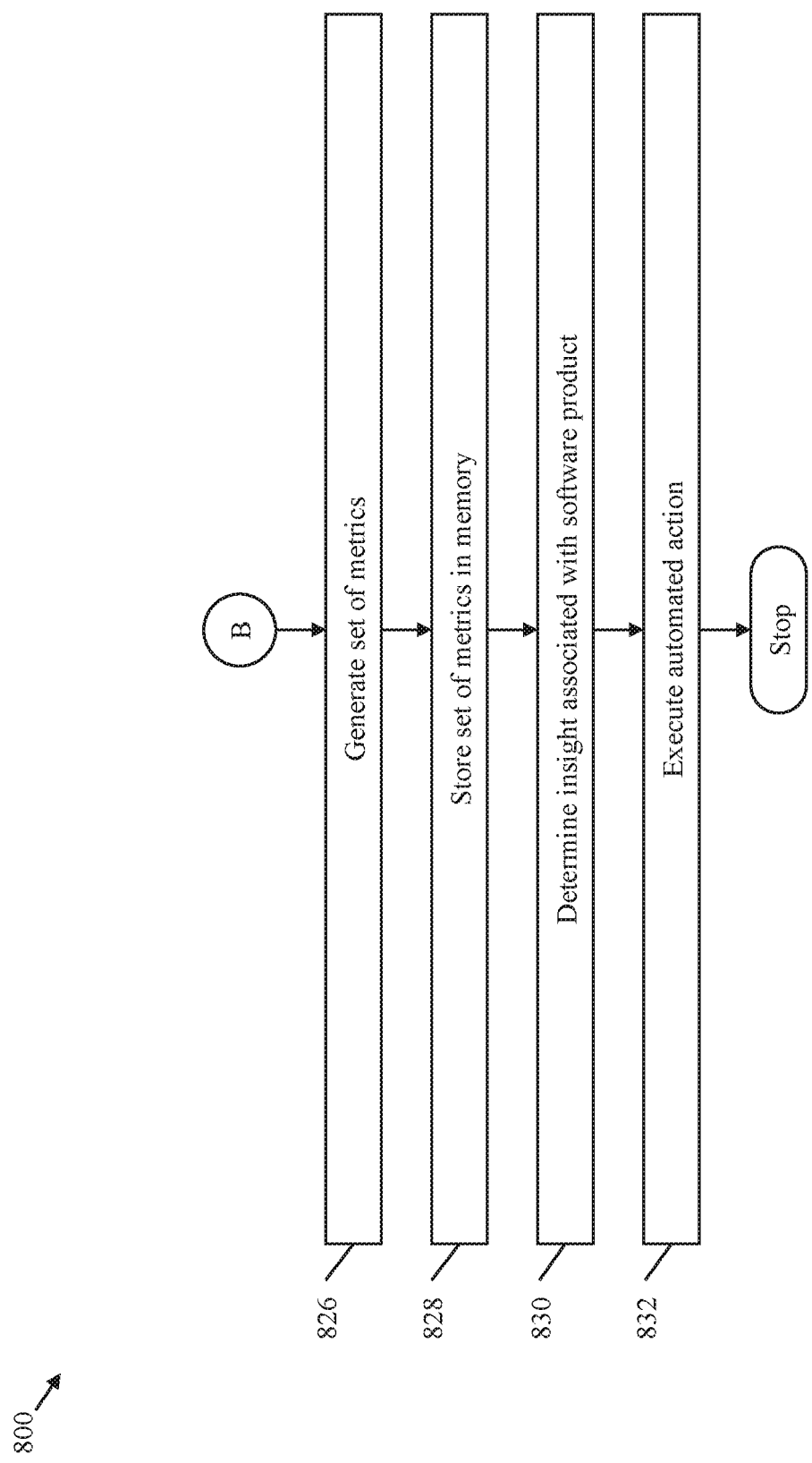
Figure 8D:
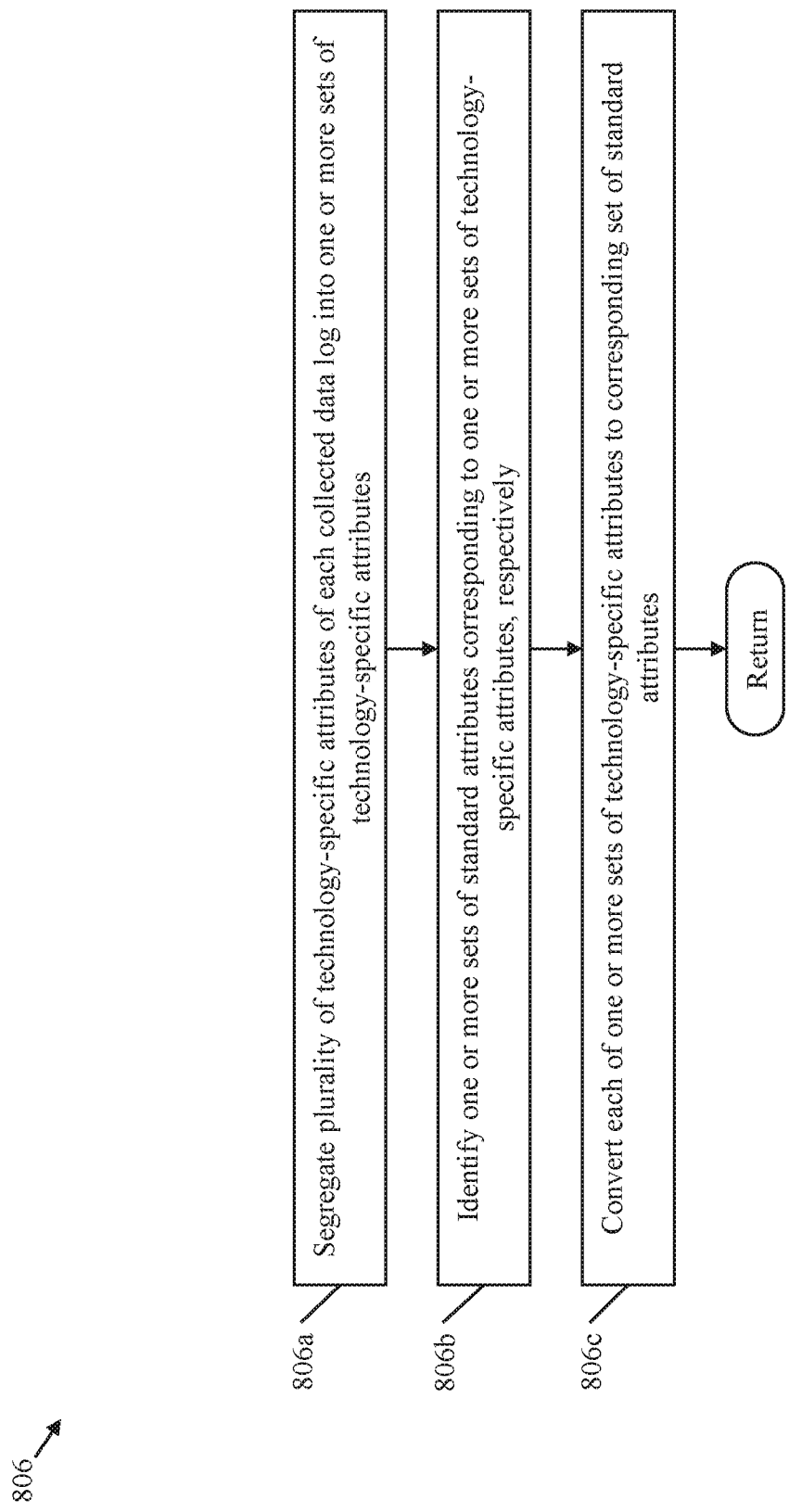

Referring to FIG. 8D, at 806a, the plurality of technology-specific attributes of each collected data log may be segregated into the one or more sets of technology-specific attributes. The processing circuitry 602 (e.g., the standardizer 406) may segregate, based on the identified set of entities, the plurality of technology-specific attributes into the one or more sets of technology-specific attributes such that each of the one or more sets of technology-specific attributes is associated with one of the set of entities. At 806b, the one or more sets of standard attributes corresponding to the one or more sets of technology-specific attributes may be identified, respectively. The processing circuitry 602 (e.g., the standardizer 406) may identify the one or more sets of standard attributes corresponding to the one or more sets of technology-specific attributes, respectively. Each of the one or more sets of standard attributes is associated with one entity of the identified set of entities and is identified from the plurality of standard attributes associated with the corresponding entity. At 806c, each of the one or more sets of technology-specific attributes may be converted to the corresponding set of standard attributes. The processing circuitry 602 (e.g., the standardizer 406) may convert each of the one or more sets of technology-specific attributes to the corresponding set of standard attributes. The collected plurality of data logs PDL is thus converted to the standardized plurality of data logs SPDL.

Referring back to FIG. 8A, at 808, the one or more sets of attribute values associated with the one or more sets of technology-specific attributes may be identified, respectively. The processing circuitry 602 (e.g., the attribute mapper 408) may identify, from the plurality of attribute values of each standardized data log, the one or more sets of attribute values associated with the one or more sets of technology-specific attributes, respectively. At 810, the one or more sets of attribute values may be mapped to the one or more sets of standard attributes, respectively. The processing circuitry 602 (e.g., the attribute mapper 408) may map the identified one or more sets of attribute values to the one or more sets of standard attributes, respectively, such that the plurality of attribute values is mapped to the one or more sets of standard attributes. At 812, the plurality of data models PDM may be updated based on the mapped plurality of attribute values of each standardized data log. The processing circuitry 602 (e.g., the attribute mapper 408) may update the plurality of data models PDM based on the standardized plurality of data logs SPDL such that each standardized data log is utilized to update the set of data models associated with the identified set of entities.

Referring to FIG. 8B, at 814, the unified data model UDM may be generated. The processing circuitry 602 (e.g., the unified data model generator 410) may generate, based on the updated plurality of data models PDM and the relationship matrix RM, the unified data model UDM that is indicative of the correlation between the plurality of entities 200. The unified data model UDM may include the plurality of standard attributes of each of the plurality of data models PDM and the set of attribute values mapped to each standard attribute of each data model. In other words, the unified data model UDM includes the first through sixth pluralities of standard attributes, with each standard attribute of the first through sixth pluralities of standard attributes having at least one attribute value mapped thereto. The correlation between the plurality of entities 200 corresponds to the correlation of one or more standard attributes of one entity with one or more standard attributes of at least one other entity. The unified data model UDM may then be utilized to determine the insight associated with the software product.

At 816, the user input USI may be received. The processing circuitry 602 (e.g., the action and definition designer 412) may receive the user input USI from the first user device 102*a* of the first user. The user input USI may be for generating the set of metrics SM. The user input USI may thus include the action portion and the definition portion. At 818, the two or more entities associated with the user input USI may be identified. The processing circuitry 602 (e.g., the generalizer 414) may identify, from the plurality of entities 200, the two or more entities associated with the user input USI. At 820, the two or more sets of standard attributes for the two or more entities may be identified, respectively. The processing circuitry 602 (e.g., the correlator 416) may identify, for the two or more entities, from the corresponding pluralities of standard attributes, the two or more sets of standard attributes, respectively. At 822, the query may be generated based on the two or more sets of standard attributes. The processing circuitry 602 (e.g., the metric generator 418) may generate the query based on the two or more sets of standard attributes. At 824, the query may be validated. The processing circuitry 602 (e.g., the metric generator 418) may validate the query based on the unified data model UDM.

Referring to FIG. 8C, at 826, the set of metrics SM may be generated. The processing circuitry 602 (e.g., the metric generator 418) may generate the set of metrics SM on the successful validation of the query. The set of metrics SM may include the two or more sets of standard attributes. At 828, the set of metrics SM may be stored in the memory 422. The processing circuitry 602 (e.g., the metric generator 418) may store the set of metrics SM in the memory 422.

At 830, the insight associated with the software product may be determined based on the set of metrics SM and the unified data model UDM. The processing circuitry 602 (e.g., the alert generator 420) may determine, based on the set of metrics SM and the unified data model UDM, the insight associated with the software product. Additional details for 830 are provided at, for example, FIG. 8E.

Figure 8E:
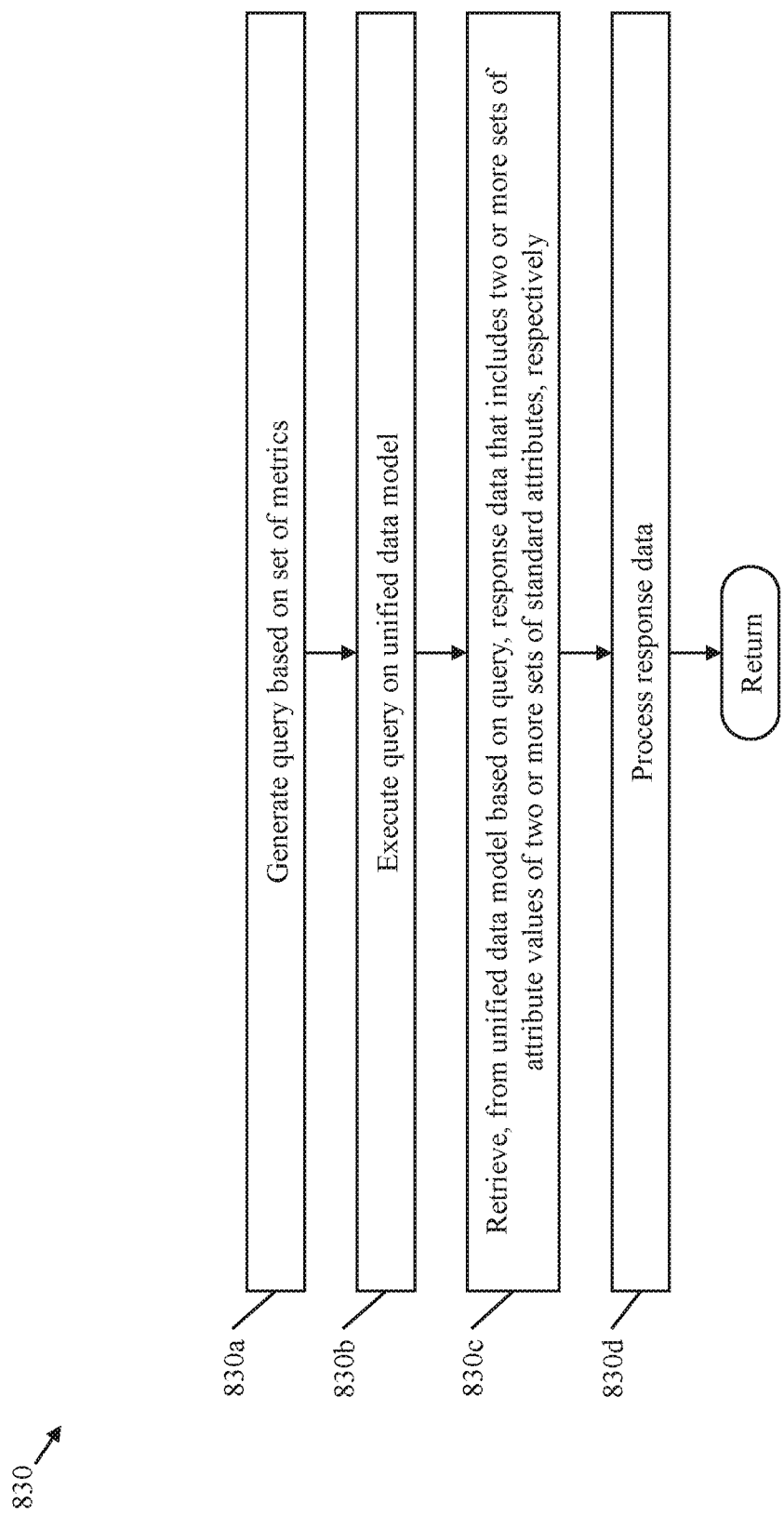

Referring to FIG. 8E, at 830*a*, the query may be generated based on the set of metrics SM. The processing circuitry 602 (e.g., the alert generator 420) may generate the query based on the set of metrics SM. The query is indicative of the correlation between the two or more entities. At 830*b*, the query may be executed on the unified data model UDM. The processing circuitry 602 (e.g., the alert generator 420) may execute the query on the unified data model UDM. At 830*c*, response data RD that includes the two or more sets of attribute values of the two or more sets of standard attributes, respectively, may be retrieved from the unified data model UDM based on the query. The processing circuitry 602 (e.g., the alert generator 420) may retrieve, from the unified data model UDM based on the query, the response data RD that includes the two or more sets of attribute values of the two or more sets of standard attributes, respectively. At 830*d*, the response data RD may be processed. The processing circuitry 602 (e.g., the alert generator 420) may process the response data RD. The insight associated with the software product may be determined based on the processed response data RD.

Referring back to FIG. 8C, at 832, the automated action may be executed. The processing circuitry 602 (e.g., the alert generator 420) may execute the automated action based on the determined insight. In other words, the alert generator 420 may execute the automated action based on the correlation indicated by the unified data model UDM. The execution of the automated action may correspond to the generation of the alert AT and the presentation of the alert AT on the first user device 102*a*. The alert generator 420 may execute the afore-mentioned operations in a periodic manner.

The flowchart 800 describes the generation of the set of metrics SM based on the user input USI (e.g., custom generation). However, it will be apparent to a person skilled in the art that the scope of the disclosure is not limited to it. In an alternate embodiment, the set of metrics SM may be generated in a default manner and may be pre-stored in the memory 422, without deviating from the scope of the disclosure. In such a scenario, the flowchart 800 may be sans 816-828.

The flowchart 800 describes the execution of the automated action based on the set of metrics SM. However, it will be apparent to a person skilled in the art that the scope of the disclosure is not limited to it. In an alternate embodiment, various AI and related technologies, such as machine learning and NLP, may be utilized to determine the insights from the unified data model UDM, and in turn, for executing the automated action, without deviating from the scope of the disclosure. In such a scenario, the alert generator 420 may be an AI circuit that is trained based on the unified data model UDM. Further, after 814, the trained AI circuit may determine the insight associated with the software product based on the real-time unified data model UDM and execute the automated action based on the determined insight.

Various embodiments of the disclosure provide a system (e.g., the application server 106) for facilitating the analysis of the software product. The system includes the processing circuitry 602. The processing circuitry 602 may be configured to collect the plurality of data logs PDL from the plurality of technologies 114. Each of the plurality of technologies 114 is associated with at least one of the plurality of stages of the SDLC of the software product. The processing circuitry 602 may be further configured to identify, from the plurality of entities 200, the set of entities associated with each of the collected plurality of data logs PDL. Each of the plurality of entities 200 corresponds to at least one of the plurality of stages of the SDLC of the software product. The plurality of entities 200 is associated with the plurality of data models PDM. Further, the processing circuitry 602 may be configured to standardize the collected plurality of data logs PDL and update the plurality of data models PDM based on the standardized plurality of data logs SPDL. The plurality of data models PDM is updated such that each of the standardized plurality of data logs SPDL is utilized to update the set of data models associated with the set of entities. The processing circuitry 602 may be further configured to generate, based on the updated plurality of data models PDM, the unified data model UDM that is indicative of the correlation between the plurality of entities 200. Further, based on the correlation indicated by the unified data model UDM, the processing circuitry 602 may be configured to execute the automated action (e.g., generate the alert AT).

The disclosed embodiments encompass numerous advantages. Exemplary advantages of the disclosed embodiments include, but are not limited to, determining the insight associated with the software product based on the correlation between data generated during all the stages of the SDLC of the software product. As a result, the degree of insights determined for the software product in the present disclosure is significantly greater than that determined using a conventional analysis technique that utilizes exclusively monitoring data generated during post-deployment monitoring of a software product.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for monitoring of software applications and health analysis. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

The invention claimed is:

1. A system for facilitating analysis of a software product, the system comprising:
processing circuitry configured to:
collect a plurality of data logs from a plurality of technologies, wherein each of the plurality of technologies is associated with at least one of a plurality of stages of a software development life cycle (SDLC) of the software product;
identify, from a plurality of entities, a set of entities associated with each of the collected plurality of data logs, wherein each of the plurality of entities corresponds to at least one of the plurality of stages of the SDLC of the software product, and wherein the plurality of entities is associated with a plurality of data models;
standardize the collected plurality of data logs;
update, based on each of the standardized plurality of data logs, a set of data models, of the plurality of data models, wherein the set of data models are associated with the set of entities;
generate, based on the updated set of data models and a relationship matrix associated with the plurality of entities, a unified data model that is indicative of a correlation between the plurality of entities, wherein the relationship matrix corresponds to one or more rules that define the correlation between the plurality of entities; and
execute an automated action based on the correlation indicated by the unified data model.

2. The system of claim 1, wherein the plurality of stages of the SDLC of the software product includes a definition stage, a design stage, a development stage, a deployment stage, a post-deployment monitoring stage, and a management stage.

3. The system of claim 1,
wherein each of the collected plurality of data logs includes a plurality of technology-specific attributes and a plurality of attribute values for the plurality of technology-specific attributes,
wherein each data model of the plurality of data models, associated with a corresponding entity of the plurality of entities, includes a plurality of standard attributes, and
wherein each of the plurality of technology-specific attributes and each of the plurality of standard attributes are associated with at least one of the plurality of stages of the SDLC of the software product.

4. The system of claim 3, wherein to standardize each of the collected plurality of data logs, the processing circuitry is further configured to:
segregate, based on the set of entities, the plurality of technology-specific attributes into one or more sets of technology-specific attributes such that each of the one or more sets of technology-specific attributes is associated with one of the set of entities;
identify one or more sets of standard attributes corresponding to the one or more sets of technology-specific attributes, respectively, wherein each of the one or more sets of standard attributes is associated with an entity of the set of entities and is identified from the plurality of standard attributes associated with the corresponding entity; and
convert each of the one or more sets of technology-specific attributes to the corresponding set of standard attributes of the one or more sets of standard attributes.

5. The system of claim 4,
wherein each of the collected plurality of data logs is standardized based on a set of standard data formats associated with the set of entities,
wherein each of the one or more sets of standard attributes is associated with a standard data format of the set of standard data formats, and
wherein each of the one or more sets of technology-specific attributes is converted, based on the associated standard data format of the set of standard data formats, to the corresponding set of standard attributes of the one or more sets of standard attributes.

6. The system of claim 4,
wherein each entity of the plurality of entities includes a plurality of sub-entities, and
wherein each of the one or more sets of standard attributes includes one or more subsets of standard attributes associated with one or more sub-entities of the plurality of sub-entities, respectively.

7. The system of claim 4, wherein the processing circuitry is further configured to:
identify, from the plurality of attribute values, one or more sets of attribute values associated with the one or more sets of technology-specific attributes, respectively;
map the one or more sets of attribute values to the one or more sets of standard attributes, respectively; and update the set of data models, associated with the set of entities, based on the mapped one or more sets of attribute values of each of the standardized plurality of data logs.

8. The system of claim 3, wherein the unified data model includes the plurality of standard attributes of each of the plurality of data models and a set of attribute values, of the plurality of attribute values, mapped to each standard attribute of the plurality of standard attributes.

9. The system of claim 8,
wherein the correlation between the plurality of entities corresponds to one or more standard attributes associated with one entity of the plurality of entities being correlated with one or more standard attributes associated with at least one remaining entity of the plurality of entities, and
wherein the plurality of standard attributes includes each of the one or more standard attributes associated with the one entity, and the one or more standard attributes associated with the at least one remaining entity.

10. The system of claim 8,
wherein the processing circuitry is further configured to determine, based on a set of metrics and the unified data model, an insight associated with the software product,
wherein the set of metrics is indicative of two or more sets of standard attributes, associated with two or more entities of the plurality of entities, respectively, required to determine the insight, and
wherein the plurality of standard attributes includes the two or more sets of standard attributes.

11. The system of claim 10,
wherein the insight is indicative of at least one of a health of the software product, a security level of the software product, a performance of the software product, or a quality level of the software product,
wherein the automated action is executed based on the insight, and
wherein the execution of the automated action corresponds to a generation of an alert.

12. The system of claim 10, wherein the processing circuitry is further configured to:
receive, from a user device of a user, a user input to generate the set of metrics;
identify, from the plurality of entities, the two or more entities associated with the user input;
identify, for the two or more entities, from the plurality of standard attributes, the two or more sets of standard attributes, respectively;
generate a query based on the two or more sets of standard attributes;
validate the query based on the unified data model; and
generate the set of metrics based on (i) the validation of the query and (ii) the two or more sets of standard attributes.

13. The system of claim 10, wherein to determine the insight associated with the software product, the processing circuitry is further configured to:
generate a query based on the set of metrics, wherein the query is indicative of a correlation between the two or more entities;
retrieve, from the unified data model based on the query, response data that includes two or more sets of attribute values of the two or more sets of standard attributes, respectively; and
process the response data, wherein the insight associated with the software product is determined based on the processed response data.

14. The system of claim 1, wherein the processing circuitry is further configured to determine, based on the unified data model, an insight associated with the software product, wherein the insight is indicative of at least one of a health of the software product, a security level of the software product, a performance of the software product, or a quality level of the software product, wherein the automated action is executed based on the insight, and wherein the execution of the automated action corresponds to a generation of an alert.

15. A method for facilitating analysis of a software product, the method comprising:
collecting, by processing circuitry, a plurality of data logs from a plurality of technologies, wherein each of the plurality of technologies is associated with at least one of a plurality of stages of a software development life cycle (SDLC) of the software product;
identifying, by the processing circuitry, from a plurality of entities, a set of entities associated with each of the collected plurality of data logs, wherein each of the plurality of entities corresponds to at least one of the plurality of stages of the SDLC of the software product, and wherein the plurality of entities is associated with a plurality of data models;
standardizing, by the processing circuitry, the collected plurality of data logs;
updating, based on each of the standardized plurality of data logs, set of data models, of the plurality of data models, wherein the set of data models are associated with the set of entities;
generating, by the processing circuitry, based on the updated set of data models and a relationship matrix associated with the plurality of entities, a unified data model that is indicative of a correlation between the plurality of entities, wherein the relationship matrix corresponds to one or more rules that define the correlation between the plurality of entities; and
executing, by the processing circuitry, an automated action based on the correlation indicated by the unified data model.

16. The method of claim 15, wherein the plurality of stages of the SDLC of the software product includes a definition stage, a design stage, a development stage, a deployment stage, a post-deployment monitoring stage, and a management stage.

17. The method of claim 15,
wherein each of the collected plurality of data logs includes a plurality of technology-specific attributes and a plurality of attribute values for the plurality of technology-specific attributes,
wherein each data model of the plurality of data models, associated with a corresponding entity of the plurality of entities, includes a plurality of standard attributes, and
wherein each of the plurality of technology-specific attributes and each of the plurality of standard attributes are associated with at least one of the plurality of stages of the SDLC of the software product.

18. The method of claim 17, wherein the standardization of each of the collected plurality of data logs comprises:
segregating, by the processing circuitry, based on the set of entities, the plurality of technology-specific attributes into one or more sets of technology-specific attributes such that each of the one or more sets of technology-specific attributes is associated with one of the set of entities;

identifying, by the processing circuitry, one or more sets of standard attributes corresponding to the one or more sets of technology-specific attributes, respectively,
wherein each of the one or more sets of standard attributes is associated with an entity of the set of entities and is identified from the plurality of standard attributes associated with the corresponding entity; and
converting, by the processing circuitry, each of the one or more sets of technology-specific attributes to the corresponding set of standard attributes of the one or more sets of standard attributes.

19. The method of claim 18, further comprising:
identifying, by the processing circuitry, from the plurality of attribute values, one or more sets of attribute values associated with the one or more sets of technology-specific attributes, respectively;
mapping, by the processing circuitry, the one or more sets of attribute values to the one or more sets of standard attributes, respectively; and
updating the set of data models, associated with the set of entities, based on the mapped one or more sets of attribute values of each of the standardized plurality of data logs.

20. A system for facilitating analysis of a software product, the system comprising:
processing circuitry configured to:
collect a plurality of data logs from a plurality of technologies,
wherein each of the plurality of technologies is associated with at least one of a plurality of stages of a software development life cycle (SDLC) of the software product, and
wherein each of the collected plurality of data logs includes a plurality of technology-specific attributes and a plurality of attribute values for the plurality of technology-specific attributes;
identify, from a plurality of entities, a set of entities associated with each of the collected plurality of data logs, wherein each of the plurality of entities corresponds to at least one of the plurality of stages of the SDLC of the software product, and wherein the plurality of entities is associated with a plurality of data models;
standardize the collected plurality of data logs;
wherein each data model of the plurality of data models, associated with a corresponding entity of the plurality of entities, includes a plurality of standard attributes, and
wherein each of the plurality of technology-specific attributes and each of the plurality of standard attributes are associated with at least one of the plurality of stages of the SDLC of the software product;
update a set of data models, of the plurality of data models, associated with the set of entities based on each of the standardized plurality of data logs;
generate, based on the updated set of data models and a relationship matrix associated with the plurality of entities, a unified data model that is indicative of a correlation between the plurality of entities,
wherein the relationship matrix corresponds to one or more rules that define the correlation between the plurality of entities, and
wherein the unified data model includes the plurality of standard attributes of each of the plurality of data models and a set of attribute values, of the plurality of attribute values, mapped to each standard attribute of the plurality of standard attributes;
execute an automated action based on the correlation indicated by the unified data model;
determine, based on a set of metrics and the unified data model, an insight associated with the software product,
wherein the set of metrics is indicative of two or more sets of standard attributes, associated with two or more entities of the plurality of entities, respectively, required to determine the insight, and
wherein the plurality of standard attributes includes the two or more sets of standard attributes,
receive, from a user device of a user, a user input to generate the set of metrics;
identify, from the plurality of entities, the two or more entities associated with the user input;
identify, for the two or more entities, from the plurality of standard attributes, the two or more sets of standard attributes, respectively;
generate a query based on the two or more sets of standard attributes;
validate the query based on the unified data model; and
generate the set of metrics based on (i) the validation of the query and (ii) the two or more sets of standard attributes.

* * * * *